US 008249992B2

(12) United States Patent
Harkness et al.

(10) Patent No.: US 8,249,992 B2
(45) Date of Patent: Aug. 21, 2012

(54) DIGITAL RIGHTS MANAGEMENT AND AUDIENCE MEASUREMENT SYSTEMS AND METHODS

(75) Inventors: David H. Harkness, Wilton, CT (US); Arun Ramaswamy, Tampa, FL (US); Kamal Nasser, Palm Harbor, FL (US); Brian Fuhrer, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 817 days.

(21) Appl. No.: 12/052,849

(22) Filed: Mar. 21, 2008

(65) Prior Publication Data
US 2008/0249961 A1    Oct. 9, 2008

Related U.S. Application Data

(60) Provisional application No. 61/029,155, filed on Feb. 15, 2008, provisional application No. 60/939,527, filed on May 22, 2007, provisional application No. 60/914,168, filed on Apr. 26, 2007, provisional application No. 60/910,717, filed on Apr. 9, 2007, provisional application No. 60/919,466, filed on Mar. 22, 2007.

(51) Int. Cl.
*G06F 21/00* (2006.01)
(52) U.S. Cl. ............... 705/59; 705/51; 705/52; 725/5; 725/28; 726/26
(58) Field of Classification Search ............ None
See application file for complete search history.

(56) References Cited

U.S. PATENT DOCUMENTS

| 5,572,643 A | 11/1996 | Judson |
| 5,574,787 A | 11/1996 | Ryan |
| 5,708,654 A | 1/1998 | Arndt et al. |
| 5,805,699 A | 9/1998 | Akiyama et al. |
| 5,850,386 A | 12/1998 | Anderson et al. |
| 5,862,260 A | 1/1999 | Rhoads |
| 5,892,900 A * | 4/1999 | Ginter et al. .................. 726/26 |
| 5,895,471 A | 4/1999 | King et al. |
| 5,918,223 A * | 6/1999 | Blum et al. .................. 1/1 |
| 6,012,087 A | 1/2000 | Freivald et al. |
| 6,069,889 A | 5/2000 | Feldman et al. |
| 6,078,917 A | 6/2000 | Paulsen, Jr. et al. |
| 6,108,637 A | 8/2000 | Blumenau |
| 6,112,202 A | 8/2000 | Kleinberg |
| 6,130,889 A | 10/2000 | Feldman et al. |
| 6,192,404 B1 | 2/2001 | Hurst et al. |
| 6,295,296 B1 | 9/2001 | Tappan |

(Continued)

OTHER PUBLICATIONS

Internet Archive Wayback Machine, archive of "Negotiating a License for Use of Music in a National Television Campaign." Archived Jul. 27, 2003. Available at <http://web.archive.org/web/20030727081310/http://www.stevegordonlaw.com/article_aslj_fall01.htm>.*

(Continued)

*Primary Examiner* — Jamie Kucab
(74) *Attorney, Agent, or Firm* — Hanley, Flight & Zimmerman, LLC

(57) ABSTRACT

Digital rights management and audience measurement systems and methods are disclosed. An example method includes receiving a request to upload media content to a content distributor, attempting to obtain a code associated with the media content, querying a program information database for program information associated with the media content using the code, and applying a business rule to the media content based on the program information.

22 Claims, 20 Drawing Sheets

U.S. PATENT DOCUMENTS

| | | | |
|---|---|---|---|
| 6,337,861 B1 | 1/2002 | Rosen | |
| 6,339,595 B1 | 1/2002 | Rekhter et al. | |
| 6,363,488 B1 | 3/2002 | Ginter et al. | |
| 6,381,341 B1 | 4/2002 | Rhoads | |
| 6,401,118 B1 | 6/2002 | Thomas | |
| 6,408,082 B1 | 6/2002 | Rhoads et al. | |
| 6,424,725 B1 | 7/2002 | Rhoads et al. | |
| 6,430,301 B1 | 8/2002 | Petrovic | |
| 6,449,367 B2 | 9/2002 | Van Wie et al. | |
| 6,501,756 B1 | 12/2002 | Katsube et al. | |
| 6,526,044 B1 | 2/2003 | Cookmeyer, II et al. | |
| 6,560,339 B1 | 5/2003 | Iwamura | |
| 6,567,533 B1 | 5/2003 | Rhoads | |
| 6,594,694 B1 | 7/2003 | Najork et al. | |
| 6,611,607 B1 | 8/2003 | Davis et al. | |
| 6,614,914 B1 | 9/2003 | Rhoads et al. | |
| 6,684,254 B1 | 1/2004 | Dutta | |
| 6,687,247 B1 | 2/2004 | Wilford et al. | |
| 6,700,990 B1 | 3/2004 | Rhoads | |
| 6,718,047 B2 | 4/2004 | Rhoads | |
| 6,760,463 B2 | 7/2004 | Rhoads | |
| 6,795,863 B1 | 9/2004 | Doty, Jr. | |
| 6,807,285 B1 | 10/2004 | Iwamura | |
| 6,807,534 B1 | 10/2004 | Erickson | |
| 6,819,774 B2 | 11/2004 | Nguyen | |
| 6,862,622 B2 | 3/2005 | Jorgensen | |
| 6,885,748 B1 | 4/2005 | Wang | |
| 6,920,133 B1 | 7/2005 | Boodaghians | |
| 6,958,998 B2 | 10/2005 | Shorey | |
| 6,975,746 B2 | 12/2005 | Davis et al. | |
| 7,043,473 B1 | 5/2006 | Rassool et al. | |
| 7,082,129 B2 | 7/2006 | Cromer et al. | |
| 7,126,944 B2 | 10/2006 | Rangarajan et al. | |
| 7,139,271 B1 | 11/2006 | Parruck et al. | |
| 7,171,016 B1 | 1/2007 | Rhoads | |
| 7,188,065 B2 | 3/2007 | Mihcak et al. | |
| 7,194,752 B1 | 3/2007 | Kenyon et al. | |
| 7,200,146 B2 | 4/2007 | Khosravi et al. | |
| 7,213,069 B2 | 5/2007 | Anderson et al. | |
| 7,318,099 B2 | 1/2008 | Stahl et al. | |
| 7,363,278 B2 * | 4/2008 | Schmelzer et al. | 705/67 |
| 7,388,869 B2 | 6/2008 | Butehorn et al. | |
| 7,565,327 B2 * | 7/2009 | Schmelzer | 705/67 |
| 7,707,224 B2 * | 4/2010 | Chastagnol et al. | 707/783 |
| 7,797,249 B2 * | 9/2010 | Schmelzer et al. | 705/67 |
| 7,970,167 B2 * | 6/2011 | Rhoads | 382/100 |
| 2002/0184630 A1 * | 12/2002 | Nishizawa et al. | 725/44 |
| 2003/0110274 A1 | 6/2003 | Pazi et al. | |
| 2004/0003398 A1 | 1/2004 | Donian et al. | |
| 2004/0059644 A1 * | 3/2004 | Blau | 705/26 |
| 2004/0139170 A1 | 7/2004 | Shen et al. | |
| 2004/0172405 A1 * | 9/2004 | Farran | 707/100 |
| 2005/0268343 A1 | 12/2005 | Onoda et al. | |
| 2006/0004691 A1 | 1/2006 | Sifry | |
| 2006/0036488 A1 | 2/2006 | Golan et al. | |
| 2006/0062426 A1 | 3/2006 | Levy et al. | |
| 2006/0085343 A1 | 4/2006 | Lisanke et al. | |
| 2006/0287916 A1 * | 12/2006 | Starr et al. | 705/14 |
| 2007/0130015 A1 * | 6/2007 | Starr et al. | 705/14 |
| 2007/0156677 A1 * | 7/2007 | Szabo | 707/5 |
| 2007/0219949 A1 * | 9/2007 | Mekikian | 707/2 |
| 2008/0082381 A1 * | 4/2008 | Muller et al. | 705/7 |

OTHER PUBLICATIONS

Internet Archive Wayback Machine, archive of "YouTube Community Guidelines." Archived Dec. 31, 2006. Available at <http://web.archive.org/web/20061231150726/http://www.youtube.com/t/community_guidelines>.*

Capturing Online Video Pirates—Technology Review. Aug. 22, 2006. Technology Review, Published by MIT. Available from <http://www.technologyreview.com/read_article.aspx?id=17343&ch=biztech>.*

GUBA and MPAA Team Up to Crack Down on Movie Piracy. Press Release. Motion Picture Association of America. Jul. 20, 2006.*

"Meet 'Johnny,' the MPAA's New Tool to Fight Piracy." Hachman, Mark. PCMag.com, Jul. 21, 2006. Available from <http://www.pcmag.com/article/print/184027>.*

Associated Press, "YouTube Installs Copyright-Protection Filters," http://www.foxnews.com/story/0,2933,302376,00.html, Oct. 17, 2007, 2 pages, San Bruno, CA.

Patent Cooperation Treaty, "International Search Report," issued by the International Searching Authority in connection with PCT application No. PCT/US2008/057794, mailed Jan. 29, 2009 (4 pages).

Patent Cooperation Treaty, "Written Opinion of the International Searching Authority," issued by the International Searching Authority in connection with counterpart PCT application No. PCT/US2008/057794, mailed Jan. 29, 2009 (8 pages).

Patent Cooperation Treaty, "International Search Report," issued by the International Searching Authority in connection with PCT application No. PCT/US2008/054151, mailed Jun. 17, 2008 (5 pages).

Patent Cooperation Treaty, "Written Opinion of the International Searching Authority," issued by the International Searching Authority in connection with counterpart PCT application No. PCT/US2008/054151, mailed Jun. 17, 2008 (8 pages).

Rose et al., "Cobra: Content-based Filtering and Aggregation of Blogs and RSS Feeds," Proceedings of the 4th USENIX Symposium on Networked Systems Design & Implementation (NSDI '07), Cambridge, USA, Apr. 2007 (14 pages).

Curran et al., "Scheduled RSS Feeds for Streaming Multimedia to the Desktop using RSS Enclosures," pp. 267-271, vol. 1, Consumer Communications and Networking Conference, $3^{rd}$ IEEE held on Jan. 8-10, 2006 (5 pages).

"Connected: An Internet Encyclopedia, Operation," retrieved from www.freesoft.org, on Aug. 13, 2003 (2 pages).

"Connected: An Internet Encyclopedia, IP Protocol Overview," retrieved from www.freesoft.org, on Aug. 13, 2003 (2 pages).

"Connected: An Internet Encyclopedia, Datagrams and Streams," retrieved from www.freesoft.org, on Aug. 13, 2003 (1 page).

"Connected: An Internet Encyclopedia, Model of Operation," retrieved from www.freesoft.org, on Aug. 13, 2003 (2 pages).

"Connected: An Internet Encyclopedia, IP Packet Structure," retrieved from www.freesoft.org, on Aug. 13, 2003 (10 pages).

"Connected: An Internet Encyclopedia, RFC Examples," retrieved from www.freesoft.org, on Aug. 13, 2003 (4 pages).

Hitachi, Ltd. et al., "5C Digital Transmission Content Protection White Paper," Revision 1.0, Jul. 14, 1998 (15 pages).

Pearson, Bill, Power Point Presentation of "Digital Transmission Content Protection," Jun. 16, 1999 (25 pages).

United States Patent and Trademark Office, "Notice of Allowance," issued in connection with U.S. Appl. No. 10/356,150, on Mar. 3, 2009 (10 pages).

United States Patent and Trademark Office, "Non-Final Office Action," issued in connection with U.S. Appl. No. 10/356,150, on Sep. 24, 2008 (10 pages).

United States Patent and Trademark Office, "Non-Final Office Action," issued in connection with U.S. Appl. No. 10/356,150, on May 28, 2008 (13 pages).

United States Patent and Trademark Office, "Notice of Panel Decision from Pre-Appeal Brief Review," issued in connection with U.S. Appl. No. 10/356,150, on Mar. 17, 2008 (2 pages).

United States Patent and Trademark Office, "Final Office Action," issued in connection with U.S. Appl. No. 10/356,150, on Aug. 8, 2007 (42 pages).

United States Patent and Trademark Office, "Non-Final Office Action," issued in connection with U.S. Appl. No. 10/356,150, on Jan. 10, 2007 (40 pages).

* cited by examiner

Packet including the protection flag

DIGITAL RIGHTS MANAGEMENT AND AUDIENCE MEASUREMENT SYSTEMS AND METHODS

RELATED APPLICATIONS

This patent claims the benefit of U.S. Provisional Patent Application No. 60/919,466, filed Mar. 22, 2007, entitled "DIGITAL RIGHTS MANAGEMENT AND AUDIENCE MEASUREMENT SYSTEMS AND METHODS," U.S. Provisional Patent Application No. 60/910,717, filed Apr. 9, 2007, entitled "DIGITAL RIGHTS MANAGEMENT AND AUDIENCE MEASUREMENT SYSTEMS AND METHODS," U.S. Provisional Patent Application No. 60/914,168, filed Apr. 26, 2007, entitled "DIGITAL RIGHTS MANAGEMENT AND AUDIENCE MEASUREMENT SYSTEMS AND METHODS," U.S. Provisional Application No. 60/939,527, filed May 22, 2007, entitled "DIGITAL RIGHTS MANAGEMENT AND AUDIENCE MEASUREMENT SYSTEMS AND METHODS," and U.S. Provisional Application No. 61/029,155, filed Feb. 15, 2008, entitled "METHODS AND APPARATUS TO CONTROL THE TRANSMISSION OF MEDIA CONTENT." The disclosures of which are incorporated by reference in their entirety.

FIELD OF THE DISCLOSURE

The present disclosure pertains to monitoring media content and, more particularly, to digital rights management and audience measurements systems and methods.

BACKGROUND

The shift from analog storage of media content to digital storage of media content has led to a rapid increase in the unauthorized distribution of media content. A consumer that purchases a single copy of media content can distribute the content to any number of other parties with little to no cost. In order to delay, discourage, and/or stop such distribution, media content producers and providers have searched for systems that will prevent unauthorized distribution without greatly affecting the ability of authorized holders of media content to enjoy that content. One method for preventing use or unauthorized distribution of media content is through technological access controls, which are often referred to as digital rights management (DRM).

User submitted content sites are websites (e.g., websites on the internet) that allow users to submit content that is made available to others via the website. For example, the website YouTube™ allows users to submit video content that is made available to the public via the website. User submitted content sites historically have not performed active monitoring of content uploaded to the website due to the difficulty in performing such monitoring and the amount of content submitted to the website. Rather, such websites typically only remove content that is not authorized for distribution when the content has been flagged by a user of the site or the site has received a letter from a content owner. Accordingly, user submitted content sites are often used for the distribution of media content that is not authorized for such distribution.

DETAILED DESCRIPTION

Internet-based distribution of content (e.g., audio, video and/or otherwise) offers media producers and distributors (e.g., studios, television stations, etc.) new opportunities to monetize their content by reaching new audiences and/or exploiting the benefits of so called "long tail economics." The example methods and apparatus described herein facilitate the deployment of media identification and management solutions to ensure media content is legally used and/or the content owners are properly compensated for such use. In addition, the example methods and apparatus provide a mechanism to facilitate targeted advertisement by better understanding the content being viewed and the audience viewing it. At least some of the example methods and apparatus described herein:

1) leverage the wide acceptance and/or usage of digital watermarking technology in the broadcast media industry (e.g., the insertion of audience measurement codes).

For example, Nielsen, the assignee of this patent, currently cooperates with broadcasters to watermark significant percentages of nationally broadcast content and local content telecast in the U.S.;

2) utilize active/passive monitoring (see, for example, Thomas, U.S. Pat. No. 5,481,294) which not only utilizes digital watermark technology, but also employs fingerprinting of content (e.g., collecting signatures and performing signature matching to identify content) which enables the identification of un-encoded content;

3) allow content to be identified and/or managed across multiple platforms and across multiple distribution networks, while enabling content consumption to be accurately measured so that content providers and/or advertisers can be compensated appropriately and to provide for better targeting of audience advertisements to desired audiences in conjunction with desired media content;

4) provide a formal and/or automated copyright labeling and/or electronic registration system;

5) can automatically notify and/or request that operators of user generated content sites act in response to detection of copyright violations. For example, content can be filtered during content upload, and/or copyright management information can be displayed at time of ingestion so that appropriate business rules can be applied. Thus, copyright owners are enabled to shift the burden for take down notifications and/or filtering to the owners of user generated content sites;

6) leverage third party detectors, that might be video-based in order to support the identification of copy-righted material that may have non-original audio or mash-up content; and/or 7) leverage title search and lexicon related searches to supplement watermarking, fingerprinting (audio and video) detection.

Figure 1:
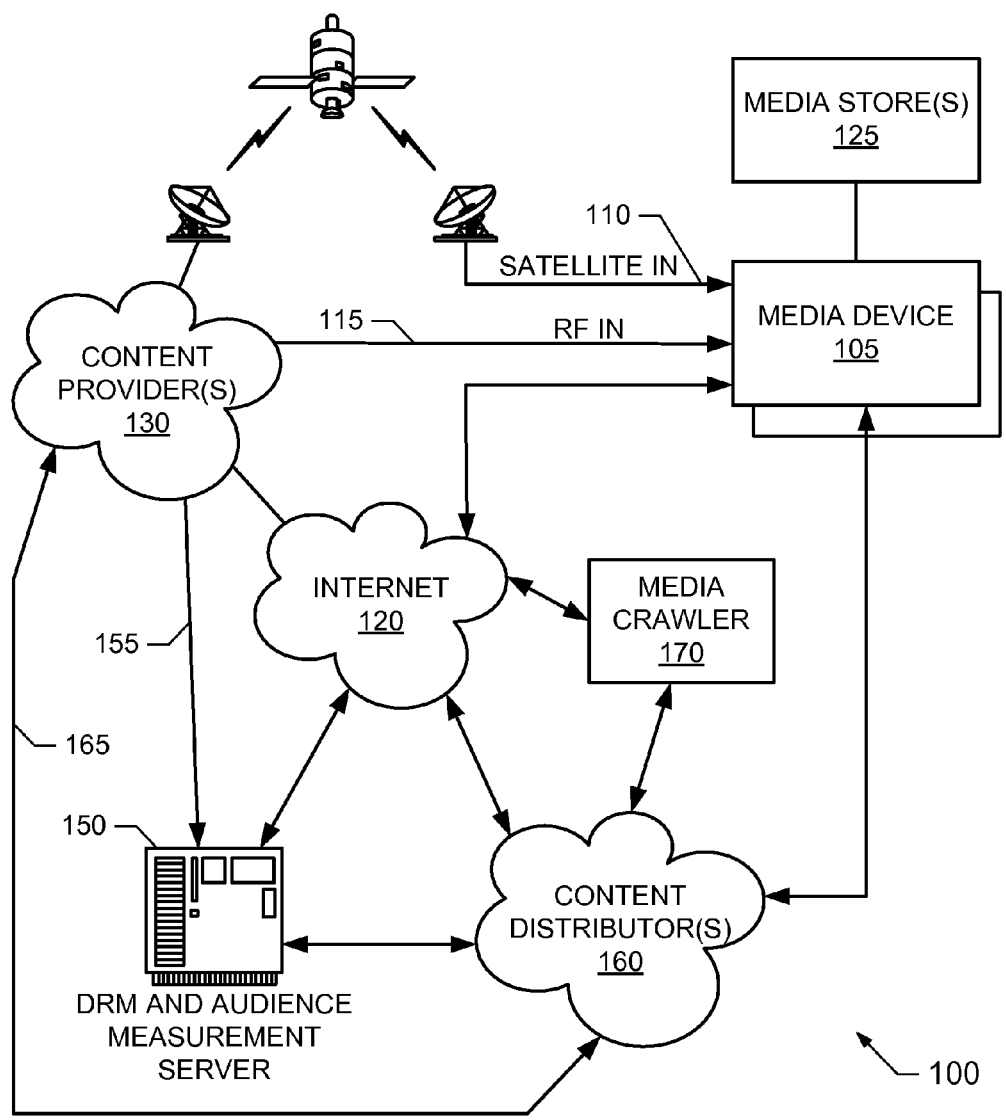
FIG. 1 is a schematic illustration of an example digital rights management (DRM) and audience measurement system constructed in accordance with the teachings of the invention.

FIG. 1 illustrates an example digital rights management (DRM) and audience measurement system 100. The example DRM and audience measurement (DRMAM) system 100 of FIG. 1 may be used to protect and/or to assist in the protection of any type(s) of copyrighted content and/or media such as, for example, audio files, video files, images, printed materials, songs, movies, web sites, advertisements, television (TV) shows and/or any combination thereof. In addition to performing and/or assisting in the performance of DRM, the example DRMAM system 100 of FIG. 1 may also collect audience measurement information and/or data useful to statistically determine and/or estimate the number and/or demographics of respondents, households and/or persons consuming and/or having an opportunity to consume (i.e., exposed to) any or all of the content managed by and/or within the example DRMAM system 100.

As set forth in detail below, the copyright verification and/or audience measurement functions may be achieved in one or more different manners. Some example implementations make use of audience measurement codes which are embedded by broadcasters 130 (e.g., television and/or radio broadcasters) in broadcasted content to identify content and/or to cross-reference a database to determine if the content is copyrighted and/or authorized for distribution. Because such audience measurement codes may be corrupted and/or removed (intentionally or as part of an encoding/compression process), some examples described below provide for insertion of audience measurement codes at other points in the distribution chain (e.g., at a content distributor 160 such as YouTube, Google®, and/or Yahoo®, by a browser and/or encoder at a media device 105, etc.) and/or for the collection of other content identifiers (e.g., metadata) associated with the content and/or for the collection of one or more signatures representative of such substantially unique characterization of the content.

Irrespective of the method of content identification employed, the collected identification information (e.g., codes, signatures, metadata, etc.) is used to cross-reference a database to determine whether the identified content is copyrighted and/or authorized for further distribution. This information provides a vehicle to enable content providers 160 such as, for example, YouTube™, Google® and/or Yahoo®, to determine whether to distribute the content (e.g., to decide not to distribute copyrighted material without authorization) and/or provide a vehicle to enable such content distributor 160 to request and/or obtain authority to distribute the content. The methods and apparatus described herein may also be used for monitoring and detection of media content in a person to person (P2P) network. As a further extension, it enables the content distributor 160 to pay for and/or facilitate payment for the distribution of copyrighted material.

To facilitate audience measurement, some example implementations discussed below insert one or more machine readable monitoring instructions into content. This can be done in response to an indication that content is authorized for distribution. The machine readable instructions can be written in any language (e.g., Java, JavaScript, etc.) and may be embedded in the content such that accessing the content requires and/or results in execution of the machine readable instructions (e.g., at the media device 105). Execution of the instructions results in the collection of audience measurement information (e.g., operating system events at the media device 105, user identification information, media device identifier, network address, time of day, time of exposure, fast forward information, number of accesses of content, etc.) and the transfer of the collected audience measurement information to an audience measurement collection site such as DRMAM server 150. The monitoring instructions can be operated in accordance with the teachings of, for example, U.S. Pat. No. 6,108,637, entitled "Content Display Monitor," and issued on Aug. 22, 2000, which is hereby incorporated by reference in its entirety.

The DRM functionality and the audience measurement functionality described herein can be provided by the same or different devices and/or entities.

The example DRMAM system 100 of FIG. 1 includes any number and/or type(s) of media devices 105 such as, but not limited to, personal computers, set-top boxes, digital video recorders, MP3 players, compression and/or digitizing equipment, web browsers, smart phones, cellular phones and/or personal digital assistants. The example media devices 105 of FIG. 1 can obtain, receive, and/or download content from any number and/or types of sources. For example, the media devices 105 may receive content from any number and/or types of content providers 130 and/or any number and/or types of content distributors 160. The media devices 105 may receive content from the content providers 130 via any number and/or types of methods and/or devices including, but not limited to, a satellite communication signal 110, a radio frequency signal 115 (e.g., a cable television signal, an over-the-air signal, etc.), a data communication network (e.g., the Internet 120), and/or one or more media store(s) 125 (e.g., a compact disc (CD), a digital versatile disc (DVD), a video cassette, a hard disk drive (HDD), and/or a memory device).

The example media devices 105 of FIG. 1 can also upload and/or provide content to any or all of the example content distributors 160. Such content may then be made available to other media devices 105 by the content distributor(s) 160. For example, the uploaded content may be downloaded and/or obtained by another media device 105. An example content distributor 160 is a website that allows subscribers to upload, download and/or share media (e.g., movies and/or music) via one or more web pages such as Google® and/or YouTube™. The content distributors 160 may also receive content from any or all of the content providers 130.

To protect, for example, copyrighted materials, the example DRMAM system 100 of FIG. 1 utilizes and/or implements digital rights management technologies. For example, content of the example DRMAM system 100 may contain one or more embedded digital watermarks to (a) enable the identification of content owners and/or content creators, to (b) verify the authenticity of content, and/or (c) to determine whether permission to distribute the content has been granted and to whom. As used herein, a "content identifier" is any type of data and/or information associated with, inherent to, embedded with, inferable from and/or injected into a piece of content, and which may be used to identify that piece of content. Audience measurement codes (e.g., audio watermarks, video watermarks, vertical blanking interval (VBI) codes, image watermarks and/or any other watermarks), public or private identifiers in bit streams (e.g., program identification (PID) headers), closed captioning information, metadata or any other type(s) of data can serve as content identifiers. A content identifier, such as an audio and/or video watermark, is generally not noticeable to the audience during playback, but this is not necessarily so. An example data structure that may be used to represent and/or store content identifiers is described below in connection with FIG. 6.

In some examples, the example DRMAM system 100 of FIG. 1 implements methods and/or apparatus to preserve embedded content identifiers during the uploading of content from a media device 105 to a content distributor 160. However, if content identifiers are not preserved (e.g., because a media device 105 does not implement the technologies described herein, due to corrupted and/or erroneous content, due to excessive compression, format conversion(s), due to user error, and/or due to malicious activity), the example DRMAM system 100 of FIG. 1 may identify such potentially corrupted and/or unauthorized content. In some examples, such unauthorized and/or corrupted content may be removed and/or restricted from being distributed, and/or may have content identification information (re-) inserted in order to restore content protection. Such (re-) insertions of content identification information may be performed and/or facilitated by the DRMAM system 100, the content distributor 106 and/or the media device 105.

The example DRMAM system 100 of FIG. 1 may also, in some examples, utilize signatures (e.g., audio signature(s), video signature(s), image signature(s) and/or otherwise) to identify content in the absence of a content identifier (e.g., an audio audience measurement code) and/or when the content has had one or more other content identifiers removed and/or disturbed by a media device 105. Signatures may be created based on any portion(s) of a signal that substantially and/or uniquely identify the signal.

The example DRMAM system 100 of FIG. 1 may, additionally or alternatively, measure and/or estimate the size and/or demographics of an audience exposed to one or more pieces of content. For example, machine executable code (e.g., a JAVA applet, JavaScript, a common gateway interface (CGI) script, etc.) may be inserted into content such that, when a piece of content is downloaded, played, viewed and/or listened to at and/or by a media device 105, the media device 105 executes the machine executable code thereby causing the media device 105 accessing the content to notify the DRMAM server 150 of the content consumption. For example, the media device 105 when executing the machine executable code may send to the DRMAM server 150 a message containing audience measurement information such as, for example, media device identifier, user identifier, content identifier, consumption time, consumption duration, network location, geographic location, content provider, etc. However, if such machine executable code is not present and/or was not preserved in a piece of content (e.g., due to a media device 105 not implementing the technologies described herein, due to corruption, due to user error and/or due to malicious activity), the example system 100 of FIG. 1 may insert and/or restore the machine readable code. For example, the content distributors 160 and/or the DRMAM server 150 can use extracted content identifiers (e.g., codes) and/or determined signatures to identify the content and, thus, identify, create, insert and/or re-insert the missing audience measurement machine executable instructions. Methods and apparatus to use machine executable code associated with content to perform audience measurement are described in U.S. Pat. No. 6,108,637, entitled "Content Display Monitor," and issued on Aug. 22, 2000.

To locate, validate and/or catalog content being managed and/or made available for distribution, the example DRMAM system 100 of FIG. 1 may include a media crawler 170. The example media crawler 170 of FIG. 1 locates and/or identifies content available to the example media devices 105, and then verifies and/or enables another entity to verify that the content distributors 160 of the located content are authorized to distribute the content. The media crawler 170 may also compile a list of available content that may be searched (e.g., using a web-based search engine) by the media devices 105 and/or users of the media devices 105. Data collected by the media crawler 170 may be stored, for example, on, by and/or within the example DRMAM server 150. Additionally or alternatively, the example media crawler 170 may generate one or more reports of located and/or identified content, and/or provide any portion of the collected data to one or more of the content providers 130 and/or the content distributors 160. An example manner of implementing the example media crawler 170 is described below in connection with FIG. 16.

Figure 2:
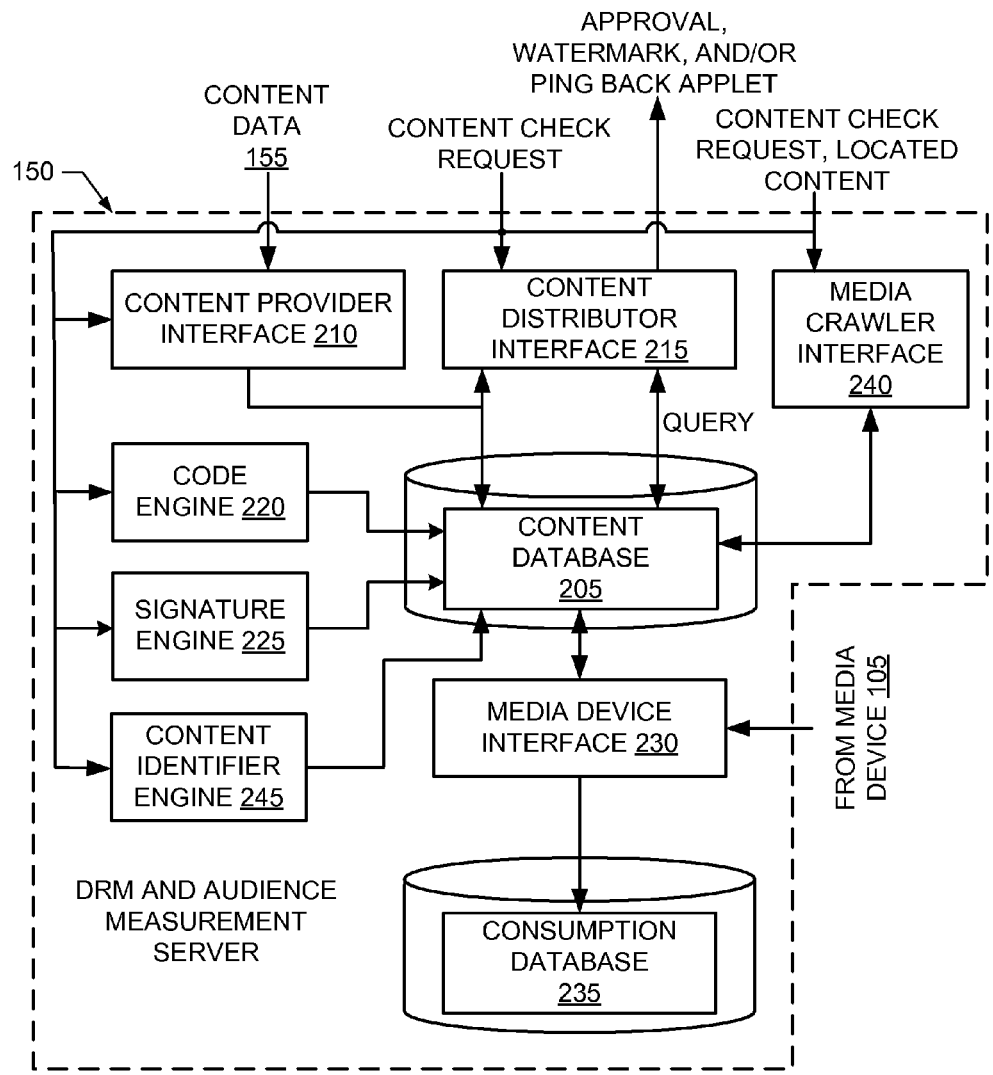
FIG. 2 is a schematic illustration of an example manner of implementing the example DRM and audience measurement server of FIG. 1.

FIG. 2 illustrates an example manner of implementing the example DRMAM server 150 of FIG. 1. To store information concerning content protected and/or measured by the example system 100 of FIG. 1, the example DRMAM server 150 of FIG. 2 includes a content database 205. An example data structure that may be used to implement the example content database 205 is described below in connection with FIG. 7. To store information regarding the consumption of and/or exposure to content, the example DRMAM server 150 of FIG. 2 includes a consumption database 235. The example consumption database 235 records data representative of the consumption of and/or exposure to particular pieces of content at and/or by particular media devices 105. Data stored in the consumption database 235 may be processed to develop meaningful content exposure and/or consumption statistics such as, for example, the overall effectiveness, reach, and/or audience demographics of content.

To interface with content providers (e.g., to receive new content and/or content identifiers, to store received content and/or content identifiers in the content database 205, to receive a content check request, etc.), the example DRMAM server 150 of FIG. 2 includes a content provider interface 210. To interface with content distributors (e.g., receive new content and/or content identifiers and/or to verify uploaded content), the example DRMAM server 150 of FIG. 2 includes a content distributor interface 215. To interface with media devices 105 (e.g., to receive audience measurement information, to receive and/or send content verification/approval information, etc.), the example DRMAM server 150 of FIG. 2 includes a media device interface 230. For example, the media device interface 230 may receive a ping from a media device 105 in order to refresh an access license (e.g., a time restricted license). To interface with the media crawler 170 (e.g., to perform content check requests, to receive information about located equipment and/or content, etc.), the example DRMAM server 150 of FIG. 2 includes a media crawler interface 240. The example interfaces 210, 215, 230 and 240 may be implemented using any number and/or type (s) of protocols (e.g., Internet protocol (IP)) and/or messages.

To extract audience measurement codes (e.g., audio, video, image and/or otherwise) for the content data 155, the example DRMAM server 150 of FIG. 2 includes any type of code engine 220 (e.g., an audio code engine). Using any type(s) of method(s), algorithm(s), circuit(s), device(s) and/or technique(s), the example code engine 220 searches, locates and/ or decodes codes (e.g., audio codes) from the content data 155. As described above, codes are commonly used in the audience measurement industry for the purposes of detecting the consumption of and/or exposure to content. Any methods and systems for insertion and detection of codes may be used such as, for example, Nielsen systems, systems from Thomson, etc. As also described above, codes can be inserted in or associated with content for audience measurement and/or DRM purposes and/or codes can be provided for other purposes (e.g., for timing such as PID headers). However, not all content is associated with codes.

To collect and/or generate signatures (e.g., audio, video, image and/or otherwise) for the content data 155, the example DRMAM server 150 of FIG. 2 includes any type of signature engine 225 (e.g., an audio signature engine). Using any type (s) of method(s), algorithm(s), circuit(s), device(s) and/or technique(s), the example signature engine 225 of FIG. 2 processes the content data 155 to determine and/or generate one or more fingerprints and/or signatures that substantially identify and/or uniquely identify the content data 155. Any methods and systems for collection and/or generation of signatures may be used such as, for example, Nielsen systems, systems from Thomson, etc. An example audio signature may be computed via data compression applied to an audio portion of the content data 155.

To extract other types of content identifiers in addition to, or instead of, content identifiers extracted, collected and/or generated by the example code engine 220 and/or the example signature engine 225 (e.g., public and/or private identifiers contained in bit streams, closed captioning information, program guide information, and/or metadata) for the content data 155, the example DRMAM server 150 of FIG. 2 includes any type of content identifier engine 245. Using any type(s) of method(s), algorithm(s), circuit(s), device(s) and/ or technique(s), the example content identifier engine 245 searches, locates and/or decodes content identifiers for the content data 155. However, not all content has inserted content identifiers. The content identifier engine 245 and the code engine 220 may be combined and/or one or both of those structures may be eliminated to suit a particular implementation. Similarly, the signature engine 225 may be eliminated and/or combined with one or both of the content identifier engine 245 and/or the code engine 220.

While an example manner of implementing a DRMAM server 150 has been illustrated in FIG. 2, one or more of the data structures, elements, processes and/or devices illustrated in FIG. 2 may be combined, divided, re-arranged, omitted, eliminated and/or implemented in any way. Further, the example databases 205 and 235, the example interfaces 210, 215, 230 and 240, the example engines 220, 225 and 245, and/or, more generally, the example DRMAM server 150 may be implemented by hardware, software, firmware and/or any combination of hardware, software and/or firmware. Further still, the example DRMAM server 150 may include data structures, elements, processes and/or devices instead of, or in addition to, those illustrated in FIG. 2 and/or may include more than one of any or all of the illustrated data structures, elements, processes and/or devices.

Figure 3:
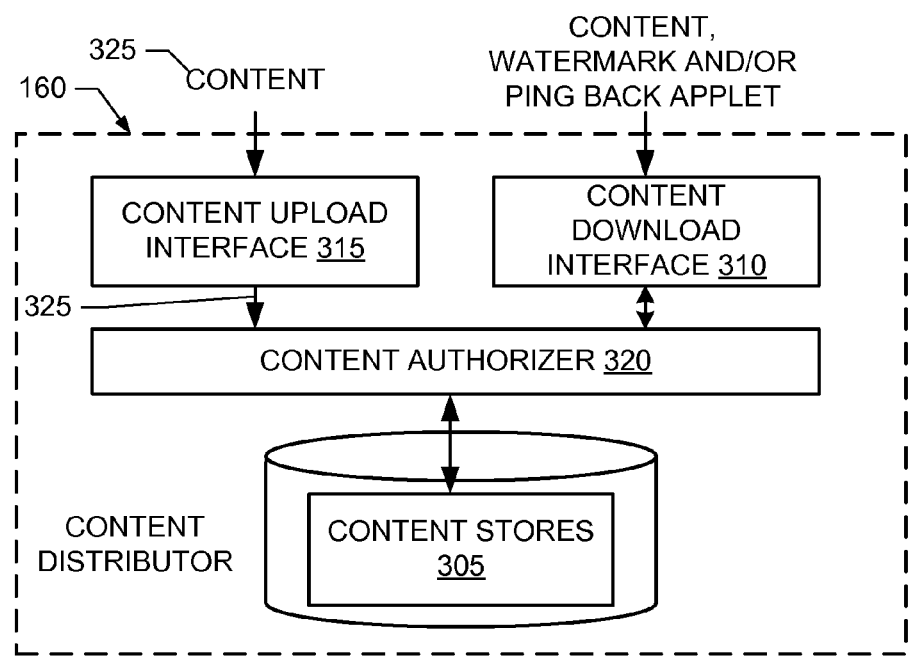
FIG. 3 is a schematic illustration of an example manner of implementing any or all of the example content distributors of FIG. 1.

FIG. 3 illustrates an example manner of implementing any or all of the example content distributors 160 of FIG. 1. To allow media device(s) 105 to download content from a content store 305, the example content distributor 160 of FIG. 1 includes any type of content download interface 310 such as, for example, any type of Web-based interface (e.g., one or more web pages).

To allow media device(s) 105 to upload and/or provide content, the example content distributor 160 of FIG. 3 includes a content upload interface 315 such as, for example, any type of web-based interface (e.g., one or more web pages). The example content upload interface 315 of FIG. 3 provides uploaded and/or received content to a content authorizer 320. The example content authorizer 320 verifies whether the content distributor 160 is authorized and/or allowed to distribute the uploaded content before the content is stored in the content stores 305 and/or made available to the media devices 105. Additionally or alternatively, the content authorizer 320 can check the validity of the content (e.g., authorization to distribute the content) during download and/ or when a request to download the content has been received at the content distributor 160. In some examples, the example content authorizer 320 is provided and/or licensed by, for example, the owner and/or operator of the example DRMAM server 150 to, for example, the owner and/or operator of the example content distributor 160 of FIG. 3. For example, the content authorizer 320 could be implemented by a standalone computing platform and/or one or more pieces of software and/or firmware to which other portions of the example content distributor 160 interface via, for example, a content authorization application programming interface (API). In some examples, the example content authorizer 320 sends an instruction(s) to the media device 105 via the content upload interface. The instruction(s) can, for example, instruct the media device 105 how to handle the media content (e.g., disable the media content, prevent access to the media content, destroy the media content, set an expiration date for the media content, reduce the quality for presentation of the media content, etc.). For example, the content authorizer 320 may send to the media device 105 an instruction to destroy media content when it is determined that the media content is not authorized for distribution and/or presentation.

Figure 4A:
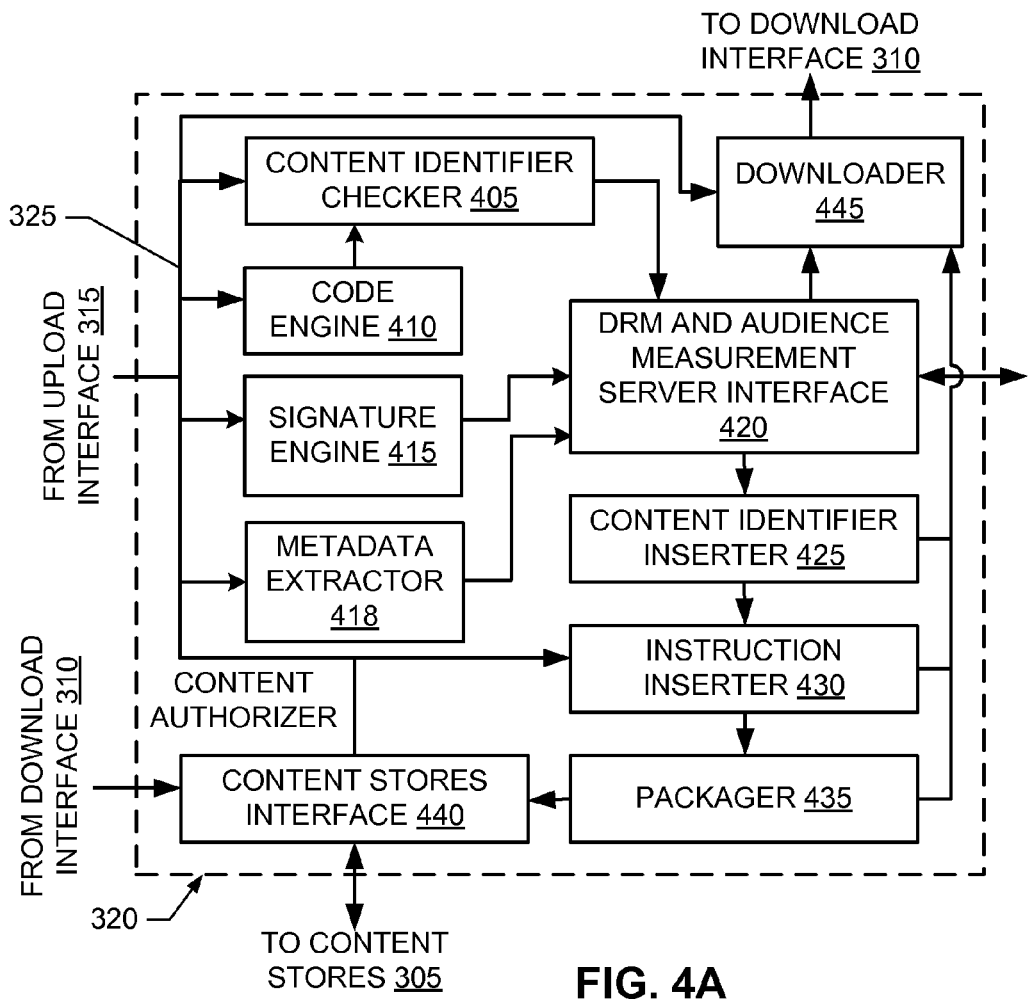
FIG. 4A is a schematic illustration of an example manner of implementing the example content authorizer of FIG. 3.

FIG. 4A illustrates an example manner of implementing the example content authorizer 320 of FIG. 3. To extract and/or verify content identifiers present in uploaded content (e.g., an audience measurement code, metadata, public identifiers and/or private identifiers), the example content authorizer 320 of FIG. 3 includes a content identifier checker 405. The example content identifier checker 405 of FIG. 4A may utilize one or more audience measurement codes (e.g., audio, video, image and/or otherwise) extracted by any type of code engine 410, and/or may extract any other types of content identifier(s) from the content (e.g., identifiers within metadata and/or identifiers associated with or embedded within the audio, image and/or video data 325). The example content authorizer 320 of FIG. 4 includes a signature engine 415 to extract, generate, and/or compute a signature (or any unique or semi-unique identification parameter) of the media content. The example signature engine 415 transmits extracted signatures and/or other identifications to the DRMAM server interface 420. The example content authorizer 320 includes a metadata extractor 418 to extract metadata (i.e., any information associated with media content (e.g., embedded in, transmitted with, or otherwise associated with the media content)) from the media content and transmit the metadata to the DRMAM 420. For example, the metadata extractor 418 may extract embedded metadata and/or may access a datastore that stores metadata associated with media content. For example, the metadata may be program information (e.g., titles, descriptions, authors, actors/actresses, genres, etc. The metadata may be used to identify media content. For example, media content may be identified using the title extracted from metadata.

In some examples, any or all of the content identifier checker 405, the code engine 410, the signature engine 415 (e.g., an audio signature engine), and/or the metadata extractor 418 are not implemented by the content authorizer 320. In such examples, the extraction and/or determination of codes, signatures and/or other content identifiers may be performed at the DRMAM server 150. Similarly, some or all of the content authorizer 320 may be located and/or implemented at another location. For example, the content authorizer 320 may be implemented by the DRMAM server 150, and/or by and/or within a media device 105 used to download content from a content distributor 160 (e.g., it could be implemented as a permitted and/or licensed plug-in to and/or for programs developed and/or sold by, companies such as Macromedia, Microsoft, Real, etc.).

To verify whether the content distributor 160 is authorized and/or allowed to distribute the content 325 in question, the example content authorizer 320 of FIG. 4A includes a DRMAM server interface 420. The example DRMAM server interface 420 of FIG. 4A outputs and/or provides content identifiers (e.g., metadata, signatures, audience measurement codes, and/or other identifiers) extracted and/or checked by the content identifier checker 405, the code engine 410 and/or the signature engine 415 to a DRMAM server 150. The DRMAM server 150 validates the information received from the content authorizer 320 and responds with information indicating whether the content distributor 160 is authorized to distribute the content. If the content distributor 160 is authorized to distribute the content, the content authorizer 320 may receive watermark data and/or machine readable audience measurement instructions to be embedded in and/or associated with the content. In some examples, the DRMAM server 150 and/or the content authorizer 320 notifies a content provider 130 when any of its content is detected at a content distributor 160 that implements and/or includes the content authorizer 320.

To prepare authorized content for distribution, the example content authorizer 320 of FIG. 4A includes any type of content identifier inserter 425 (e.g., an encoder that re-encodes the content after adding a digital content identifier and/or adds a content identifier directly to the already encoded content), any type of instruction inserter 430 (e.g., that inserts machine executable instruction(s) and/or a reference to any type of executable instruction(s) into any portion of the content (e.g., the metadata) to be executed when the content is accessed), and/or any type of packager 435 (e.g., that creates and/or stores the content in a data structure suitable for storage in the content stores 305). To store and/or access the packaged content stored by and/or within the content stores 305, the example content authorizer 320 of FIG. 4A includes a content stores interface 440.

To download and/or provide requested content, the example content authorizer 320 of FIG. 4A includes the content store interface 440 and a downloader 445. When content is requested by the example content download interface 310, the content store interface 440 of FIG. 4A retrieves the requested content from the content stores 305 and provides the retrieved content to one or more of the content identifier checker 405, the code engine 410, the signature engine 415, and/or the metadata extractor 418. As described above, the content identifier checker 405, the code engine 410, the signature engine 415, the signature engine 415, and/or the DRMAM server interface 420 then verify that the requested content is authorized to be downloaded. However, authorization to download content need not be performed when the download is performed. For example, content distribution authorization may be checked and/or verified during upload thereby eliminating the need to perform distribution authorization during download, and/or content distribution authorization may be checked and/or verified on content already stored (but possibly not previously checked and/or verified) in the content stores 305 (e.g., in an offline processing model). However, the verification of authorization during download allows a content provider 130 and/or the DRMAM server 150 to change content distribution privileges over time, and/or to maintain and/or monitor the authenticity of content stored by and/or within the content stores 305.

When the DRMAM server interface 420 receives an indication that the requested content is authorized to be downloaded, the example downloader 445 of FIG. 4A provides the content retrieved by the example content store interface 440 to the example content download interface 310. However, if the authorization of the content is not to be verified, the downloader 445 provides the retrieved content to the content download interface 310 without waiting for direction from the DRMAM server interface 420. Moreover, if content identifiers and/or machine executable audience measurement instructions are to be inserted into or otherwise associated with the retrieved content, the retrieved content may be first processed by one or more of the content identifier inserter 425, the instruction inserter 430 and/or the packager 435.

Figure 4B:
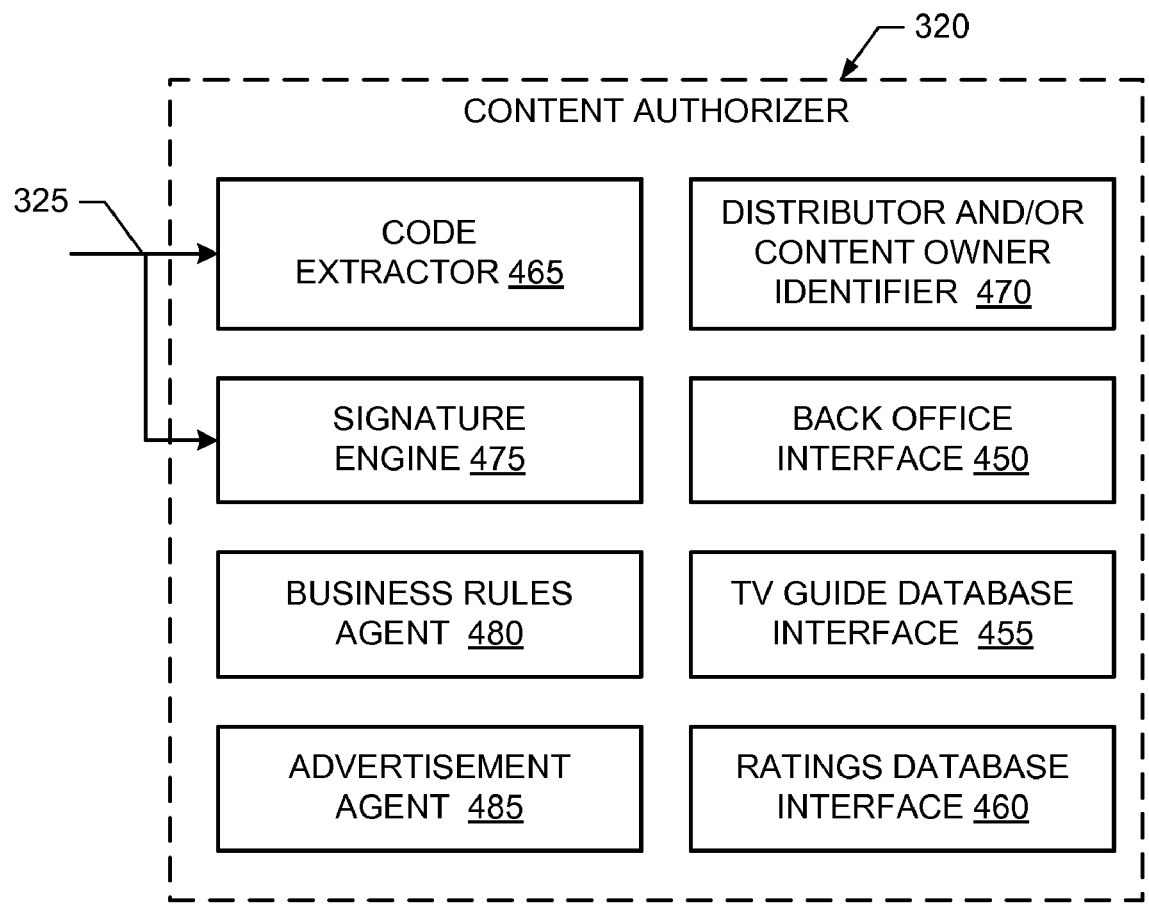
FIG. 4B is a schematic illustration of another example manner of implementing the example content authorizer of FIG. 3.

FIG. 4B illustrates another example manner of implementing the example content authorizer 320 of FIG. 3. To interact with a processing server (e.g., the example DRMAM server 150 and/or a Nielsen Back Office), the example content authorizer 320 of FIG. 4B includes a back office interface 450. The example back office interface 450 of FIG. 4B may be used to send metadata codes and/or signatures for the content 325 to a processing server to obtain distributor and/or content owner information, and/or the date and/or time at which content 325 was broadcast.

To obtain television guide information, the example content authorizer 320 of FIG. 4B includes a television guide database interface 455. The example television guide database interface 455 may be used to query a television guide database server to obtain metadata, program name, program description, genre, etc. for the content 325.

To obtain content consumption ratings, the example content authorizer 320 of FIG. 4B includes a ratings database interface 460. The example ratings database interface 460 of FIG. 4B may be used to query a ratings database server (e.g., one or more Nielsen Company databases) to obtain historical and/or current ratings and/or demographics information and/or or data for the content 325.

To extract codes from the content 325 or a signal (e.g., a digital data stream) associated with the content, the example content authorizer 320 of FIG. 4B includes a code extractor 465. The example code extractor 465 of FIG. 4B searches for, identifies and/or extracts one or more codes (e.g., audio, video, image, and/or otherwise) contained in or associated with the content 325.

To identify a content owner and/or distributor, the example content authorizer 320 of FIG. 4B includes a distributor and/or content owner identifier 470. For example, based on one or more codes obtained by the example code extractor 465, the example distributor and/or content owner identifier 470 of FIG. 4B determines a content owner and/or distributor for the content 325 by using the code(s) to index a database mapping codes to content owners and/or distributors. Additionally or alternatively, the example distributor and/or content owner identifier 470 may utilize the example back office interface 450 of FIG. 4B to obtain the content owner and/or distributor for the content 325, for example, by passing obtained codes to the back office for code matching.

To determine (e.g., compute) signatures, the example content authorizer 320 of FIG. 4B includes any type of signature engine 475 (e.g., an audio signature engine). Using any type(s) of method(s), algorithm(s), circuit(s), device(s) and/or technique(s), the example signature engine 475 of FIG. 4B processes the content data 325 to determine and/or generate one or more fingerprints and/or signatures that substantially identify and/or uniquely identify the content data 325. An example signature may be computed via applying data compression to an audio portion of the content data 325.

If the example code extractor 465 of FIG. 4B cannot identify suitable codes in or associated with the content 325, signatures generated by the example signature engine 475 may be used by the example distributor and/or content owner identifier 470 and/or the example back office interface 450 to identify the content owner and/or distributor for the content 325. Alternatively, codes and signatures can both be used to reduce the search space and/or for other purposes.

To implement business and/or copyright rules for uploaded content 325, the example content authorizer 320 of FIG. 4B includes a business rules agent 480. The example business rules agent 480 of FIG. 4B automatically applies one or more rules such as, for example, removing copyrighted content, paying a royalty to the content owner, negotiating a license for the content 325 with the content owner, adding the content 325 to an existing content owner contract, etc.

To associate advertisements with the content 325, the example content authorizer 320 of FIG. 4B includes an advertising agent 485. The example advertising agent 485 of FIG. 4B uses historical and/or current ratings data and/or information (e.g., obtained via the example ratings database interface 460) and metadata (e.g., obtained via the television Guide database interface 455) to identify (e.g., identify an advertisement that is related to the media content, identifying an advertisement or advertiser that desires to advertise with the media content, match the media content to criteria indicated by an advertiser, etc.) and/or negotiate (e.g., indicate a requested cost for displaying an advertisement) with advertisers that may be interested in having their advertisements associated with the content 325. Such advertisements could be provided and/or displayed when the content 325 is downloaded by, for example, a user of the example content distributor 160 of FIG. 3.

While an example manner of implementing any or all of the content distributors 160 of FIG. 1 has been illustrated in FIGS. 3, 4A and/or 4B, one or more of the data structures, elements, processes and/or devices illustrated in FIGS. 3, 4A and/or 4B may be combined, divided, re-arranged, omitted, eliminated and/or implemented in any other way. Further, the example interfaces 310, 315, 420, 440, 450, 455 and 460, the example content stores 305, the example content authorizer 320, the example watermark checker 405, the example engines 410, 415, 418, the example watermark inserter 425, the example instruction inserter 430, the packager 435, the example downloader 445, the example code extractor 465, the example distributor and/or content owner identifier 470, the example signature engine 475, the example business rules agent 480, the example advertising agent 485 and/or, more generally, the example content distributor 160 of FIGS. 3, 4A and/or 4B may be implemented by hardware, software, firmware and/or any combination of hardware, software and/or firmware. Thus, for example, any of the example interfaces 310, 315, 420, 440, 450, 455 and 460, the example content stores 305, the example content authorizer 320, the watermark checker 405, the example engines 410, 415, 418, the example watermark inserter 425, the example instruction inserter 430, the packager 435, the example downloader 445, the example code extractor 465, the example distributor and/or content owner identifier 470, the example signature engine 475, the example business rules agent 480, the example advertising agent 485 and/or, more generally, the example content distributor 160 of FIGS. 3, 4A and/or 4B could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example interfaces 310, 315, 420, 440, 450, 455 and 460, the example content stores 305, the example content authorizer 320, the example watermark checker 405, the example engines 410, 415, 418, the example watermark inserter 425, the example instruction inserter 430, the packager 435, the example downloader 445, the example code extractor 465, the example distributor and/or content owner identifier 470, the example signature engine 475, the example business rules agent 480, the example advertising agent 485 and/or, more generally, the example content distributor 160 of FIGS. 3, 4A and/or 4B are hereby expressly defined to include a tangible medium such as a memory, DVD, CD, etc. Further still, the example content distributor 160 may include data structures, elements, processes and/or devices instead of, or in addition to, those illustrated in FIGS. 3, 4A and/or 4B, and/or may include more than one of any or all of the illustrated data structures, elements, processes and/or devices.

Figure 5:
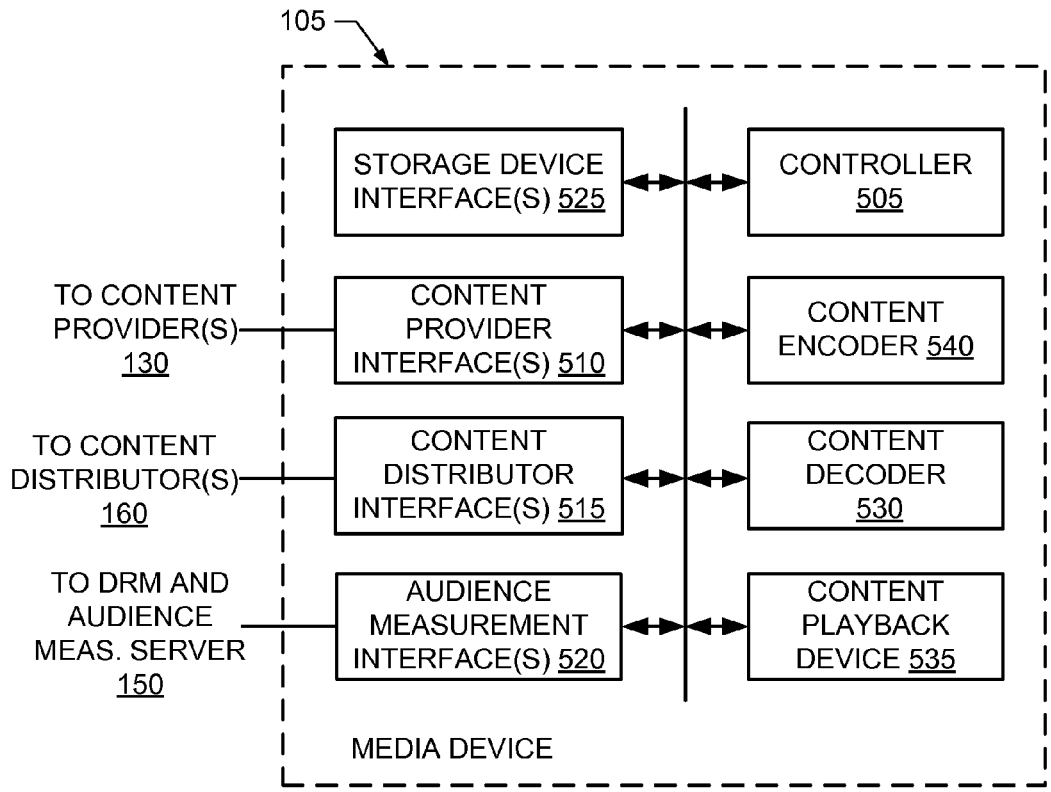
FIG. 5 is a schematic illustration of an example manner of implementing any or all of the example media devices of FIG. 1.

FIG. 5 illustrates an example manner of implementing any or all of the example media devices 105 of FIG. 1. To control the overall operation, the example media device 105 of FIG. 5 includes any type of controller and/or processor 505. The controller 505 may be implemented by one or more general purpose processors, processor cores, microcontrollers, etc.

To interface with any or all of the example content providers 130, any or all of the example content distributors 160, and/or the example DRMAM server 150, the example media device 105 of FIG. 5 includes a content provider interface 510, a content distributor interface 515 and an audience measurement interface 520, respectively. The example interfaces 510, 515 and 520 may be implemented using any protocol(s) (e.g., IP) and/or messages. To store content, the example media device 105 of FIG. 5 includes any number and/or types of storage device interface 525 that facilitates storage of content on any number and/or types of storage devices such as, for example, a hard disk drive (HDD), a compact disk (CD), a digital versatile disk (DVD), a memory and/or a memory device.

To play and/or view content, the example media device 105 of FIG. 5 includes any number and/or types of content decoders 530 (e.g., a JPEG decoder, an MP3 decoder and/or an MPEG decoder) and any number and/or types of content output devices 535 (e.g., a display, a screen and/or a speaker). To encode content (e.g., prior to transmission to a content distributor 160), the example media device 105 of FIG. 5 includes an encoder 540. In some examples, the encoder 540 preserves any content identifiers (e.g., watermarks, codes, metadata, etc.) and/or any audience measurement executable instructions present in the content by, for example, removing them and then re-inserting them after and/or during content encoding. For example, the decoder 530 and/or the encoder 540 transcode (e.g., decode and then encode in a different format) and/or converts content received via any of the example interfaces 510, 515 and 525 between one or more formats thereby causing the content to be suitable for upload to, for example, a content distributor 160. In particular, the encoder 540 can implement a content identifier engine (e.g. a code engine) to detect content identifiers contained in the content, and/or to re-insert and/or encode the content identifiers for a new content format. Methods and apparatus to transcode content and/or content identifiers are described in U.S. Patent Publication No. 2006/0242325, entitled "Methods and Apparatus for Transcoding Metadata," and published on Oct. 26, 2006, which is hereby incorporated by reference in its entirety.

While the blocks of FIG. 5 are described as implementing the media device 105, the same or substantially similar blocks may be used to implement a device at a content distributor (e.g., the content distributor 160), at a content provider (e.g., the content provider 130), or device or system. For example, the content distributor 160 may transcode media content using similar blocks to those described in conjunction with FIG. 5.

While an example manner of implementing any or all of the media devices 105 of FIG. 1 has been illustrated in FIG. 5, one or more of the data structures, elements, processes and/or devices illustrated in FIG. 5 may be combined, divided, rearranged, omitted, eliminated and/or implemented in any way. Further, the example controller 505, the example interfaces 510, 515, 520 and 525, the example decoder 530, the example playback device 535, the example encoder 540 and/or, more generally, the example media device 105 may be implemented by hardware, software, firmware and/or any combination of hardware, software and/or firmware. Thus, for example, any of the example controller 505, the example interfaces 510, 515, 520 and 525, the example decoder 530, the example playback device 535, the example encoder 540 and/or, more generally, the example media device 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example controller 505, the example interfaces 510, 515, 520 and 525, the example decoder 530, the example playback device 535, the example encoder 540 and/or, more generally, the example media device 105 are hereby expressly defined to include a tangible medium such as a memory, DVD, CD, etc. Further still, the example media device 105 may include data structures, elements, processes and/or devices instead of, or in addition to, those illustrated in FIG. 5, and/or may include more than one of any or all of the illustrated data structures, elements, processes and/or devices. For example, the media device 105 may include some, all or any portion(s) of the example content authorizer 320 of FIGS. 4A and/or 4B to determine an authorization to upload, distribute, download, consume, play and/or otherwise process content.

Figure 6:
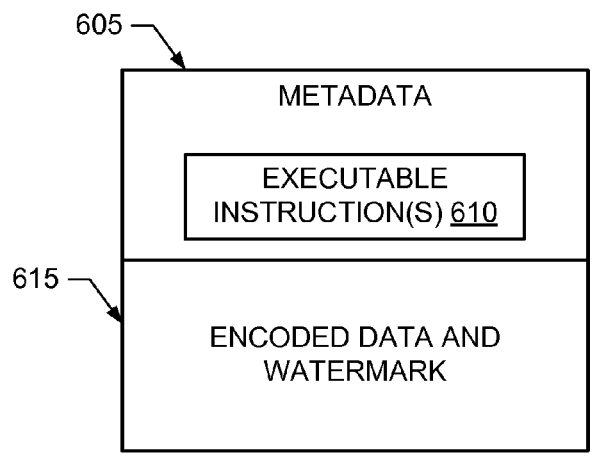
FIG. 6 illustrates an example data structure that may be used to implement and/or store content including audience measurement instructions and/or a digital watermark.

FIG. 6 illustrates an example data structure that may be used to represent and/or store content. To represent information about content, the example data structure of FIG. 6 includes any amount and/or types of metadata 605. For example, the metadata 605 may include information concerning content ownership, content creation date, encoding data rate, and/or may contain and/or link to machine executable instruction(s) 610 (e.g., a JAVA applet, JavaScript, etc.) that can be executed to collect and send audience measurement data at a media device 105 accessing content associated with instructions added to send the collected data to a DRMAM server 150.

To store content data and any embedded watermark(s) (e.g., audience measurement codes), the example data structure of FIG. 6 includes data 615. The example data 615 may be implemented in accordance with any past, present and/or future specification and/or standard (e.g., MP3, JPEG, MPEG-3, etc.).

Figure 7:
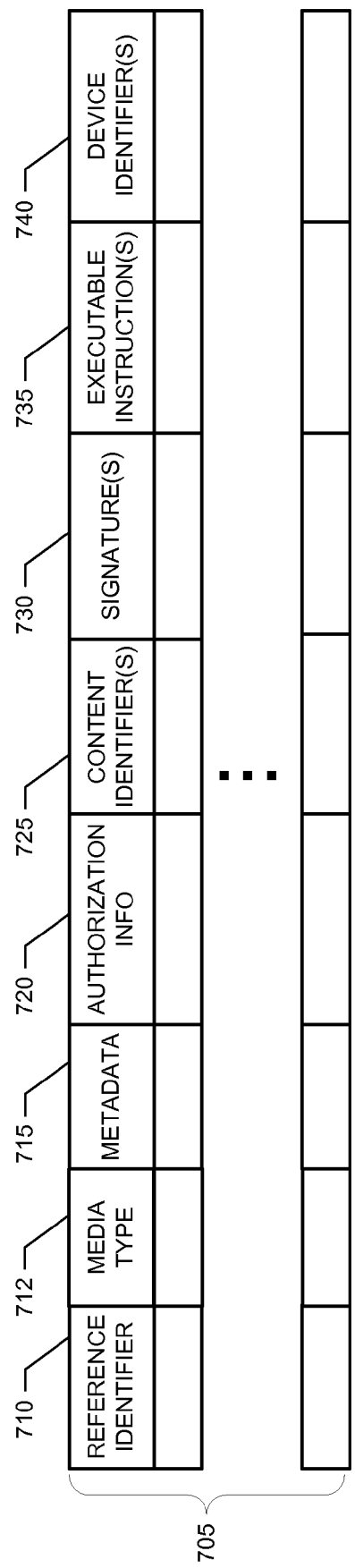
FIG. 7 illustrates an example data structure that may be used to implement any or all of the example content databases of FIGS. 1 and/or 2.

FIG. 7 illustrates an example data structure that may be used to implement the example content database 205 of FIG. 2. The example data structure of FIG. 7 contains a plurality of entries 705 for respective ones of a plurality of content being managed by and/or for which audience measurement data is to be collected. To identify a piece of content, each of the example entries 705 of FIG. 7 includes a reference identifier field (e.g., containing an integer value) that uniquely identifies the piece of content. To identify a media type (e.g., Windows Media Video (WMV), QuickTime, Flash, Moving Picture Experts Group Layer 3 (MP3), Joint Photographic Experts Group (JPEG), portable document format (PDF), etc.), each of the example entries 705 of FIG. 7 includes a media type field 712. To store metadata, each of the example entries 705 of FIG. 7 includes a metadata field 715 that stores the content's metadata (e.g., content provider, program name, performer(s), actor(s), parental guide information, audience ratings, content guidance rating, etc.). To store information representative of who is authorized to distribute the content, each of the example entries 705 of FIG. 7 includes an authorization information field 720 (e.g., containing a list of authorized content distributors 160).

To store information concerning content identifiers (e.g., audience measurement codes, PID headers, other codes) and/or signatures, each of the example entries 705 of FIG. 7 includes a content identifier(s) field 725, and a signature(s) field 730. To store machine executable instruction(s) and/or a reference to the same that may be executed to provide audience measurement information concerning, for example, monitoring a media device 105 accessing the associated content, each of the example entries 705 of FIG. 7 includes an executable instruction(s) field 735. To store information concerning media devices 105 that uploaded the content, each of the example entries 705 of FIG. 7 includes a device identifier(s) field 740. The example device identifier(s) field 740 of FIG. 7 contains one or more values and/or strings that represent a sequence of characters identifying one or more media devices 105 and/or content distributors 160 that may have transcoded, transmitted, shared and/or uploaded the content. This identification information may include device serial number, IP address, a license number, an authentication parameter, and/or a combination thereof. Information in the example metadata field 715 and/or information in the example device identifier(s) field 735 may be used to track and/or determine who has modified and/or distributed the content. For example, the metadata field 715 can identify an originating content distributor 130, and the device identifier(s) field 704 can identify the particular user (and/or media device 105) that uploaded the content and/or identify the particular content distributor 160 who distributed the content.

While example data structures have been illustrated in FIGS. 6 and 7, the content database 205 and/or content may be implemented using any number of additional and/or alternative fields and/or entries.

Figure 8:
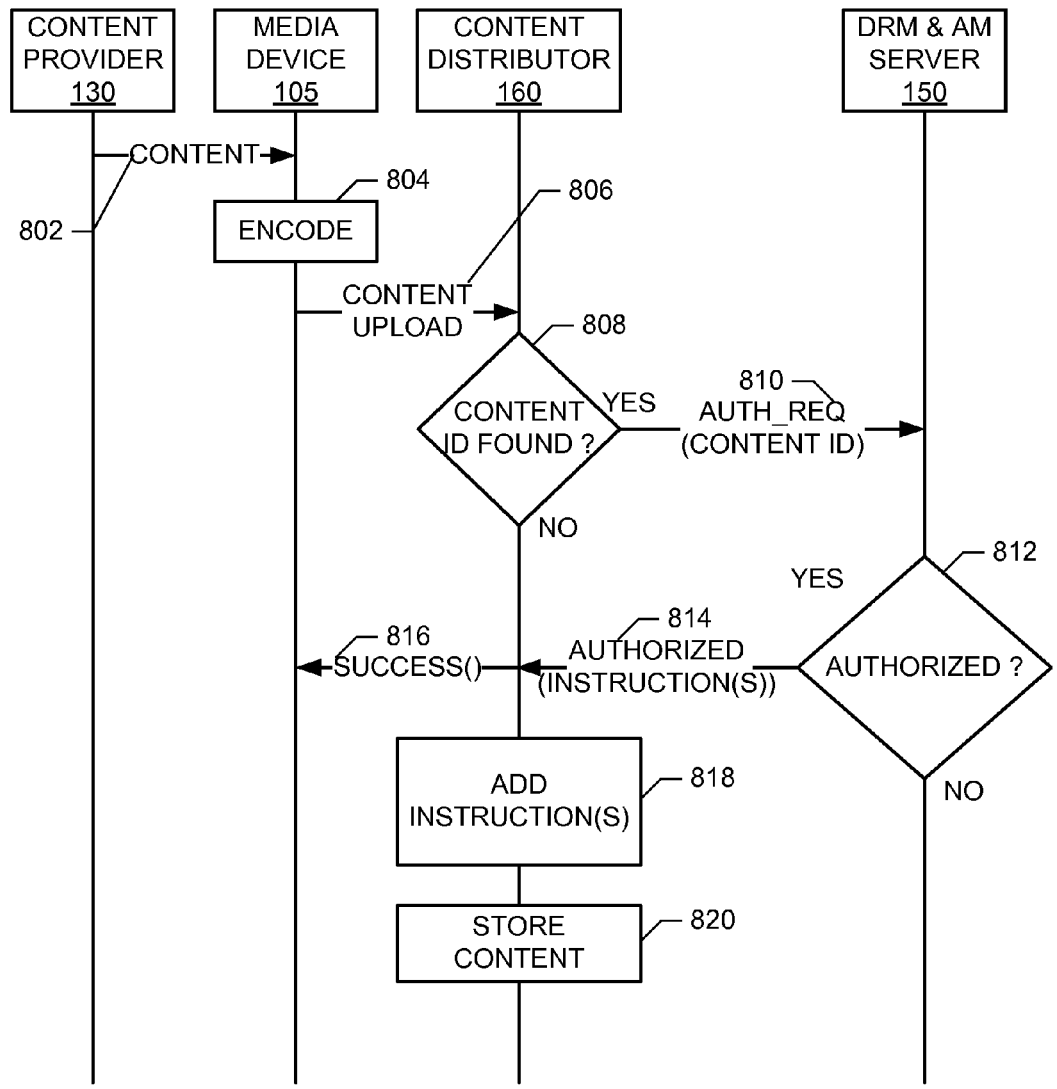
FIGS. 8, 9, 10, 11, 12, and 13 illustrate example manners of implementing and/or operating the example DRM and audience measurement system of FIG. 1.

FIGS. 8-13 illustrate example manners of operating and/or implementing the example DRMAM system 100 of FIG. 1. In the illustrated example of FIG. 8, the media device 105 receives content from a content provider 130 (block 802), and then encodes the received content (e.g., to apply additional compression and/or to format the content prior to upload to a particular content distributor 160) (block 804). When the media device 105 uploads the content to the content distributor 160 (block 806), the content distributor 160 checks if the uploaded content contains a valid content identifier (ID) (e.g., a content identification code or any other type of code) (block 808). In the example of FIG. 8, the content contains a valid content identifier, and the content distributor 160 sends an authorization check request to the DRMAM server 150 (block 810). The DRMAM server 150 then determines if the content distributor 160 is authorized to distribute the content (block 812). In the illustrated example, the content distributor 160 is authorized to distribute the content and, thus, the DRMAM server 150 sends an authorized response to the content distributor 160 (block 814). The content distributor 160 notifies the media device 105 of the authorized upload (block 816), creates and/or associates machine readable instruction(s) with the content (block 818) and then stores the content for distribution to media devices 105 (block 820). The instruction(s) are associated with the content such that, when the content is accessed by a media device 105, the media device 105 will execute the audience measurement instruction(s) to collect audience measurement data and forward the same to an audience measurement site such as the DRMAM server 150.

Figure 9:
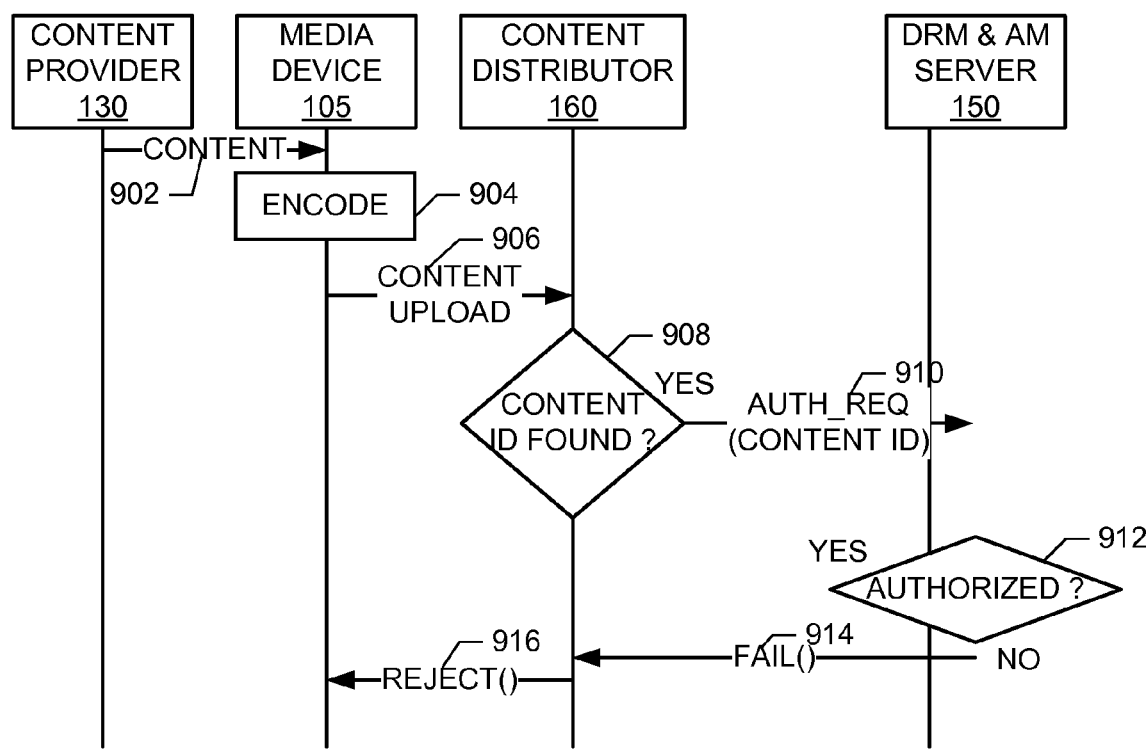

The illustrated example of FIG. 9 is similar to the example described above in connection with FIG. 8 but in this example, the content is not authorized for distribution. In the illustrated example of FIG. 9, the media device 105 receives content from a content provider 130 (block 902), and then encodes the received content (e.g., to apply additional compression and/or to format the content prior to upload to a particular content distributor 160) (block 904). When the media device 105 uploads the content to the content distributor 160 (block 906), the content distributor 160 checks if the uploaded content contains a valid content identifier (ID) (e.g., a code) (block 908). In the example of FIG. 9, the content contains a valid content identifier, and the content distributor 160 sends an authorization check request to the DRMAM server 150 (block 910). The DRMAM server 150 then determines if the content distributor 160 is authorized to distribute the content (block 912). However, in the illustrated example of FIG. 9, in contrast to the example of FIG. 8, the content distributor 160 is not authorized to distribute the content. Accordingly, the DRMAM server 150 sends an authorization failed response to the content distributor 160 (block 914) who, subsequently sends an upload rejected response (which may or may not identify the reason for the rejection as a copyright issue) to the media device 105 (block 916). In addition, the content distributor 160 (e.g., the DRMAM server interface 420, the content identifier checker 405, etc.) and/or the DRMAM server 150 may send an instruction or indication to the media device 105 that instructs and/or forces the media device 105 to delete, disable, revoke a license, or prevent access to the media content. For example, if the DRMAM server 150 and/or the content distributor 160 determines that the media content is not authorized for presentation by the media device 105, the DRMAM server 150 and/or the content distributor 160 sends an instruction to the media device 105 to erase the media content, establish an expiration date upon which the media content becomes unusable, display a warning message at the media device, etc. The media device 105 may then transmit an indication, notification, message, etc. to the content distributor 160 and/or the DRMAM server 150 indicating that the media content was or was not successfully deleted.

Figure 10:
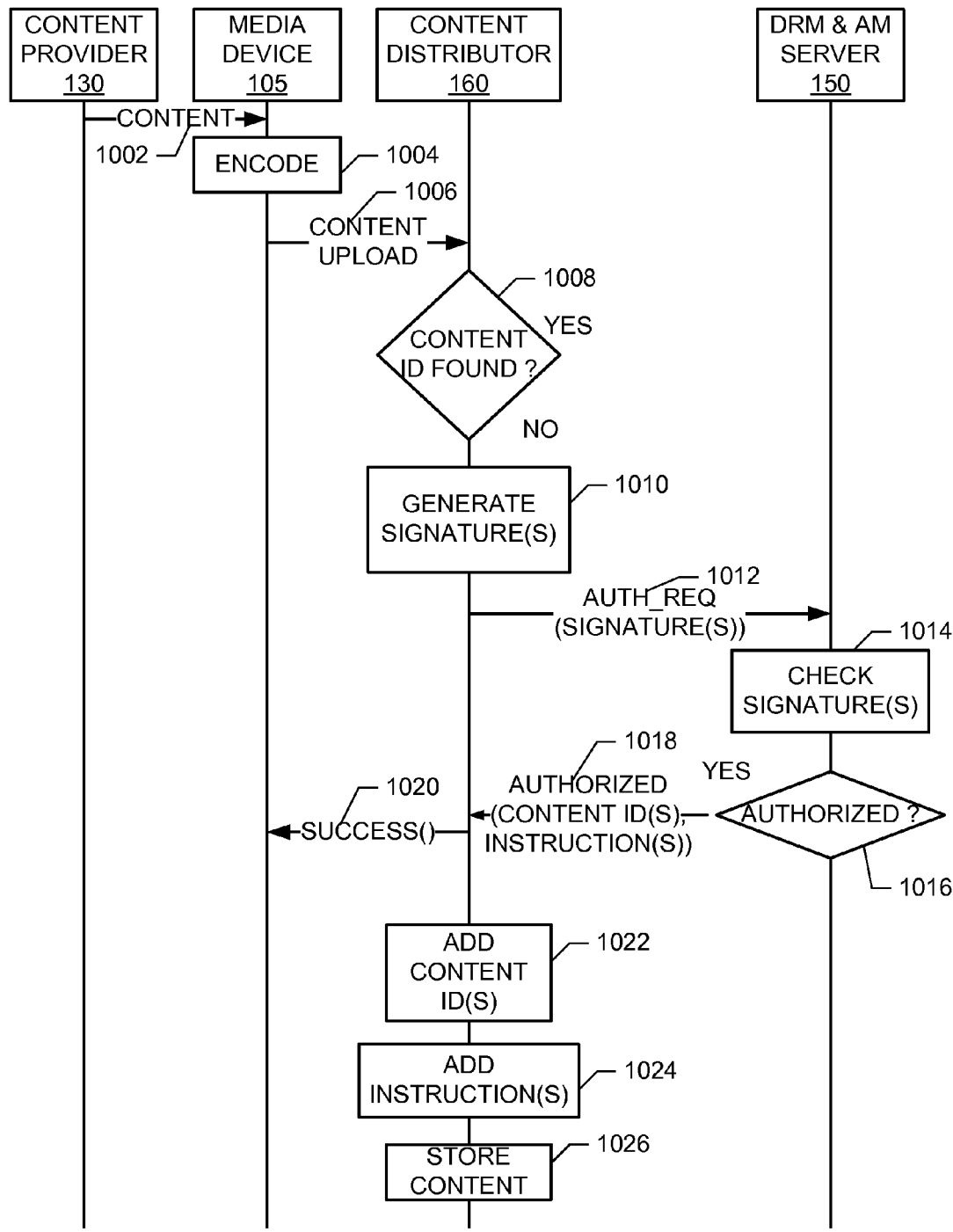

The illustrated example of FIG. 10 proceeds similar to that described above in connection with FIG. 8, but in this example, no content ID is present in the media content. In the illustrated example of FIG. 10, the media device 105 receives content from a content provider 130 (block 1002). At some later point in time (e.g., seconds, minutes, hours, days, weeks, months, and/or years), the media device 105 encodes the received content (e.g., to apply additional compression and/or to format the content prior to upload to a particular content distributor 160) (block 1004). When the media device 105 uploads the content to the content distributor 160 (block 1006), the content distributor 160 checks if the uploaded content contains a valid content identifier (ID) (e.g., an audience measurement code) (block 1008). However, in the illustrated example of FIG. 10, the uploaded content received by the content distributor 160 does not contain a content identifier (block 1008). The content distributor 160 generates one or more signatures (e.g., audio, video, image and/or otherwise) (block 1010), and sends an authorization request to the DRMAM server 150 containing the generated signature(s) (block 1012). The DRMAM server 150 then checks the signatures (block 1014) and determines if the content distributor 160 is authorized to distribute the content (block 1016). In the illustrated example, the content distributor 160 is authorized to distribute the content and, thus, the DRMAM server 150 sends an authorized response to the content distributor 160 (block 1018). Moreover, because the content did not contain a content identifier, the DRMAM server 150 includes one or more content identifiers in its response (block 1018). The content distributor 160 notifies the media device 105 of the authorized upload (block 1020), adds the content identifier(s) to the content (block 1022), creates and/or associates machine readable instruction(s) with the content (e.g., executable code to collect audience measurement information or enforce digital rights management rule) (block 1024) and then stores the content for distribution to media devices 105 (block 1024).

In the example of FIG. 10, content identifiers may be, for example, an audience measurement code (e.g., audio, video, image and/or otherwise) inserted into or otherwise associated with the content by, for example, a content broadcaster 130 or a content distributor 160 to identify the content as is commonly done today in the audience measurement industry. Other types of codes and/or metadata could additionally or alternatively be employed. If such a content identifier is not present, the content distributor 160 can collect and/or compute one or more signatures of the content signal to facilitate identification of the content signal by comparison of the collected and/or computed signature(s) against a database of signature(s). The content distributor 160 may also collect such signatures when a content identifier is present (in whole or in part as might occur due to noise or compression), and/or may collect other codes such as program identification headers (PIDs) for digital program streams, metadata associated with the content, or any other available indicator to facilitate identification of the content. In some examples, when a content distributor 160 inserts content identifiers into content, they, among other things, identify that the content distributor 160 (e.g., local television station, YouTube, etc.) is distributing the content and also identify the originating content provider 130 (e.g., NBC®) of the content. Thus the content identifier(s) can be used to specify and/or identify either or both the source and the distributor(s) of the content.

Figure 11:
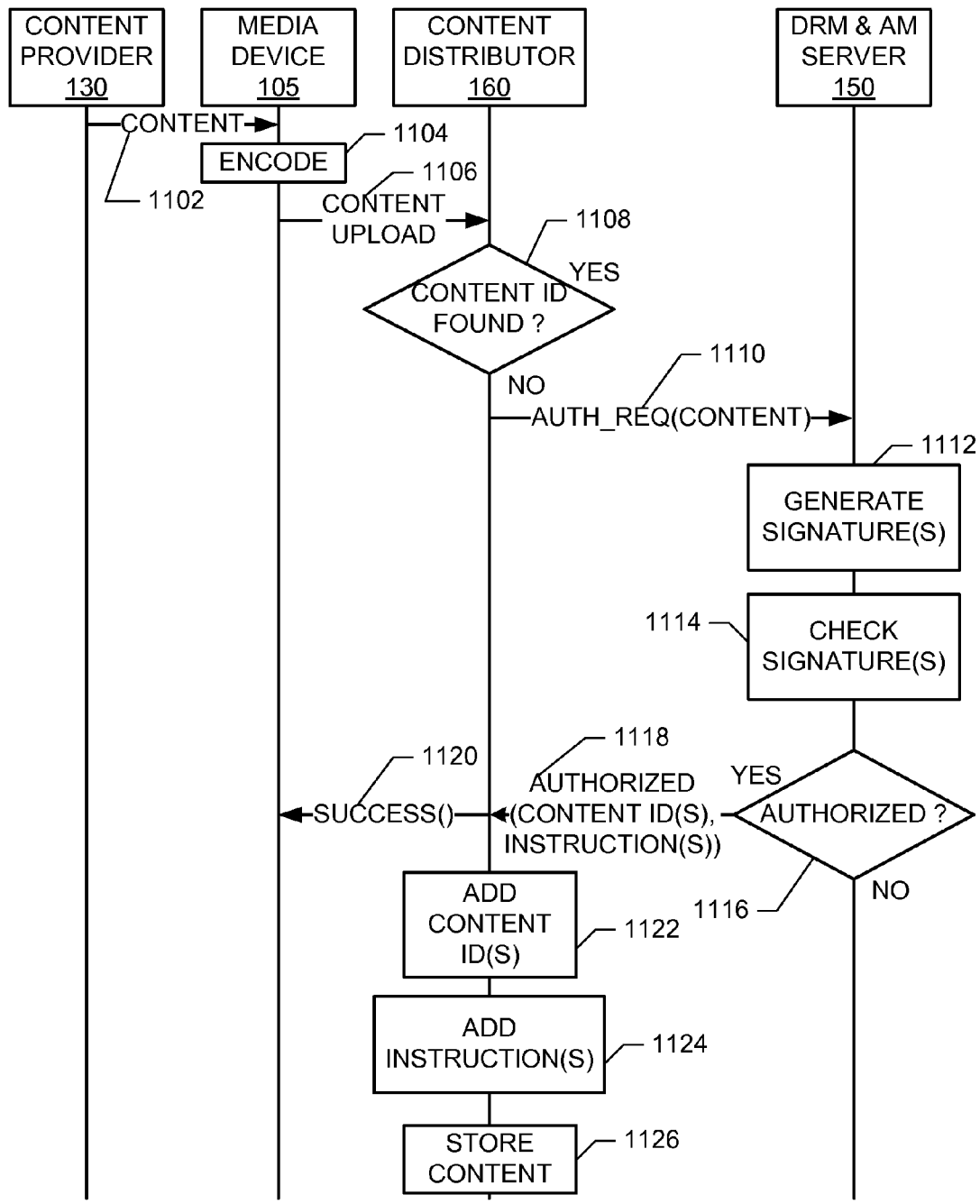

The illustrated example of FIG. 11 proceeds similar to that described above in connection with FIG. 10, but no signature is created at the content distributor 160. In the illustrated example of FIG. 11, the media device 105 receives content from a content provider 130 (block 1102), and, at some later time and/or date, encodes the received content (e.g., to apply additional compression and/or to format the content prior to upload to a particular content distributor 160) (block 1104). When the media device 105 uploads the content to the content distributor 160 (block 1106), the content distributor 160 checks if the uploaded content contains a valid content identifier (ID) (e.g., an audience measurement code) (block 1008). In the illustrated example of FIG. 11, like the example of FIG. 10, the uploaded content received by the content distributor 160 does not contain a content identifier. However, rather than generating a signature(s) in the illustrated example of FIG. 11, the content distributor 160 transfers the content to the DRMAM 150 (block 1110), and the DRMAM server 150, rather than the content distributor 160, collects and/or generates the signature(s) (e.g., audio, video, image and/or otherwise) (block 1112). The DRMAM server 150 checks the signature(s) (block 1114) and then determines if the content distributor 160 is authorized to distribute the content (block 1116). In the illustrated example, the content distributor 160 is authorized to distribute the content and, thus, the DRMAM server 150 sends an authorized response to the content distributor 160 (block 1118). Moreover, because the content did not contain a content identifier, the DRMAM server 150 includes one or more content identifiers in its response (block 1118). The content distributor 160 notifies the media device 105 of the authorized upload (block 1120), adds the content identifier(s) to the content (block 1122), creates and/or associates machine readable (audience measurement and/or DRM) instruction(s) with the content (block 1124) and then stores the content for distribution to media devices 105 (block 1124).

In the illustrated examples of FIGS. 8-11, the content distributor 160 and/or the DRMAM server 150 check and/or determine the authorization to upload, store and/or download content. However, the example media device 105 may, additionally or alternatively, attempt to detect content ID(s), compute signatures and/or use the same to determine whether the device is authorized to upload and/or download the content in question. For example, the media device 105 may contain, include and/or implement all or any portion of any or all of the example content authorizers 320 of FIGS. 3, 4A and/or 4B, and/or include functionality and/or an interface so that the media device 105 may interact with the DRMAM server 150 (i.e., without going through the content distributor 160) to authorize a content upload and/or download.

Figure 12:
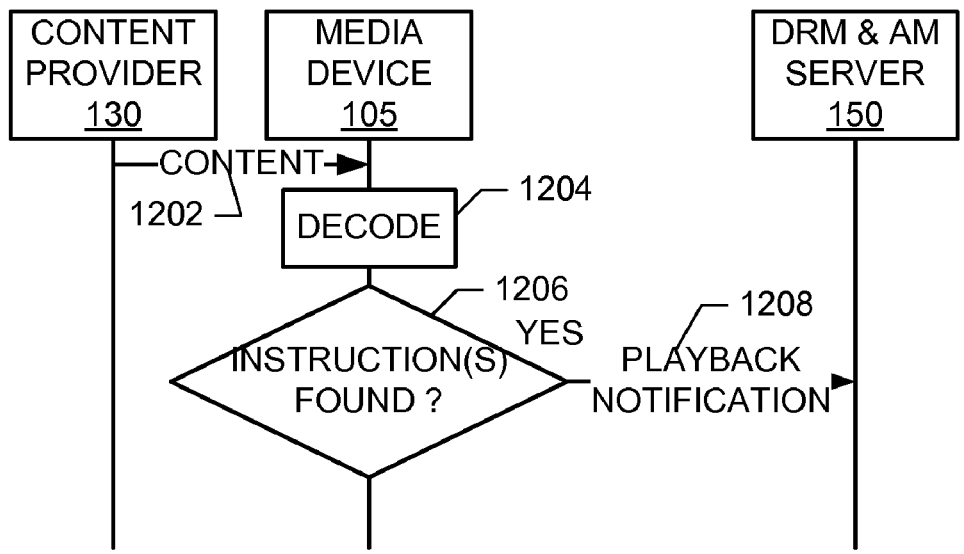
Figure 13:
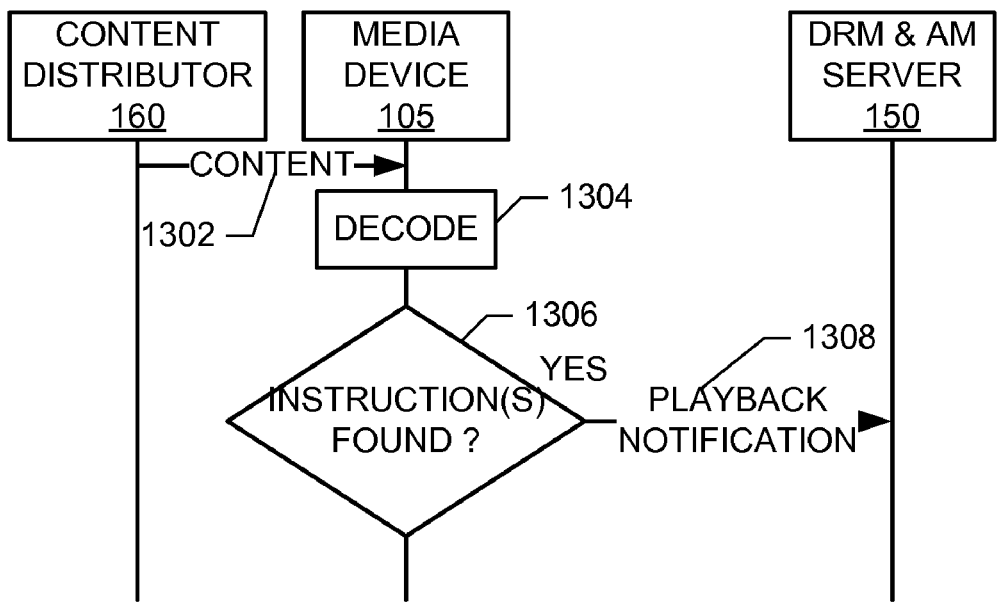

The examples of FIGS. 12 and 13 illustrate the operation of the media device 105 during the display and/or playback of content. Because the operations are similar, FIGS. 12 and 13 are described together. The media device 105 receives content from the content provider 130 (FIG. 12) or a content distributor 160 (FIG. 13) (block 1202/1302). The media device 105 decodes the content (block 1204/1304). If the received content contains one or more machine executable (audience measurement and/or DRM) instructions (e.g., in the metadata of the content, as part of an HTML file, as a reference to retrieve such instructions from a network server, etc.) (block 1206/1306), the media device 105 executes the instructions before, during or after it displays the content, performs the associated operation (e.g., sends a notification to the DRMAM server 150, etc.) and sends audience measurement information such as a playback notification or user interaction information to the DRMAM server 150 (e.g., destroys the content after a set number of accesses, etc.) (block 1208/1308).

Figure 14:
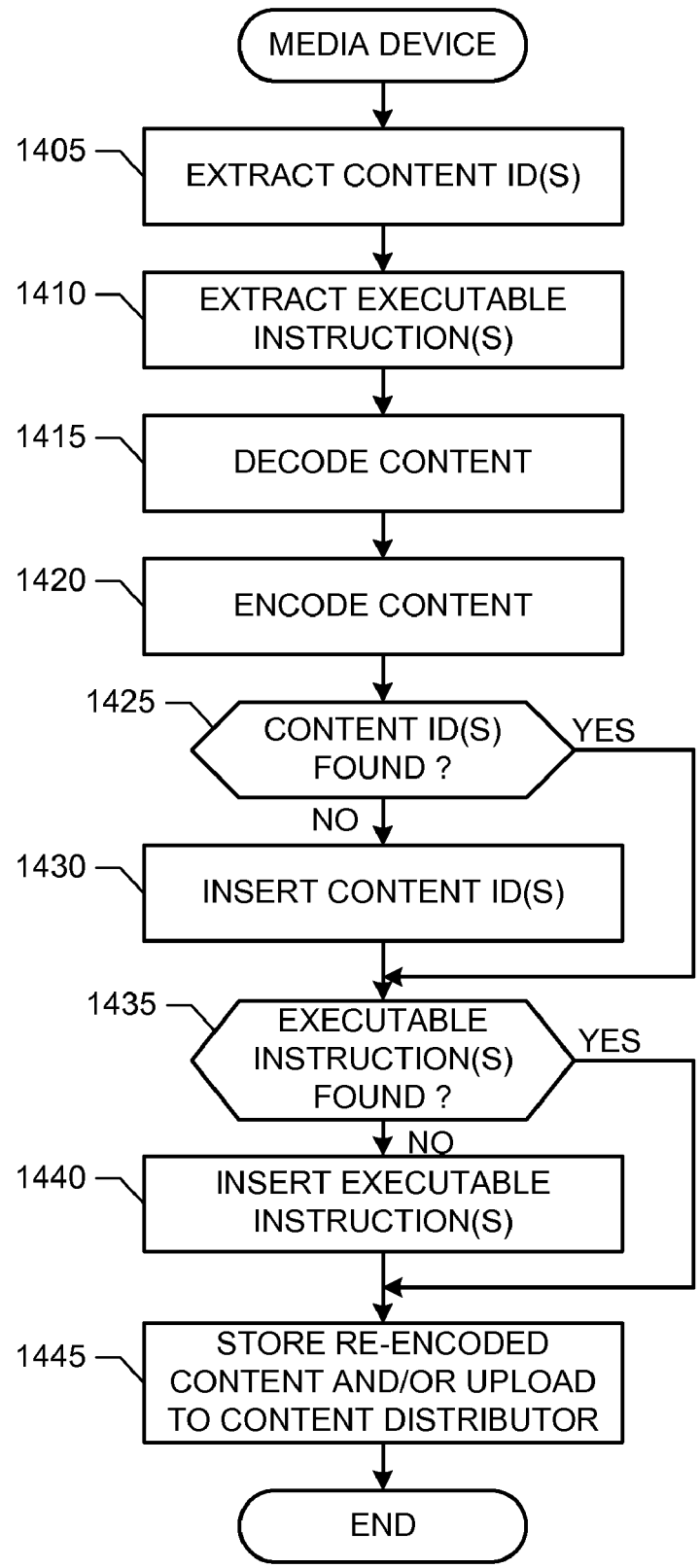
FIG. 14 is a flowchart representative of example machine accessible instructions that may be executed to implement any or all of the example media devices described herein.

FIG. 14 is a flowchart representative of example machine accessible instructions which may be carried out to implement any or all of the example media devices 105 described herein. The flowchart of FIG. 14 begins when the example controller 505 of the example media device 105 extracts (or attempts to extract) one or more content ID(s) from the media content (block 1405). The controller 505 then extracts and/or retrieves (or attempts to extract and/or retrieve) one or more executable instruction(s) from the media content (or from a networked location specified by an instruction associated with the content) (block 1410). For example, the controller 505 may determine if the content includes one or more content ID(s) and/or one or more executable instruction(s) (or references to such instructions) such as a call to a JAVA applet) before attempting to perform extraction.

Next, the example content decoder 530 decodes the content (block 1415) and the example content encoder 540 encodes the content 1420 (block 1420). For example, the content may be decoded and encoded (i.e., transcoded) to convert the content from a first encoding format to a second encoding format (e.g., when media content is to be uploaded to a website that requires a format different than the original format of the media content). After the media content is transcoded, the example controller 505 determines if one or more content ID(s) were found in block 1405 (block 1425). If one or more content ID(s) were not found (block 1425), control proceeds to block 1435, which is described below.

If one or more content ID(s) were found (block 1425), the controller 505 inserts the content ID(s) into the transcoded media content or otherwise associating the content ID(s) with the transcoded media content (block 1430). For example, decoding (block 1415) and encoding (block 1420) may remove the content ID(s) or cause the content ID(s) to be rendered unreadable. Therefore, the controller 505 re-associates the content ID(s) detected at block 1405. Alternatively, if decoding (block 1415) and encoding (block 1420) does not affect the content ID(s), block 1425 and/or block 1430 may be skipped.

The example controller 505 then determines if one or more executable instruction(s) were found in block 1410 (block 1435). If one or more executable instruction(s) were not found in block 1410 (block 1435), control proceeds to block 1445, which is described below. If one or more executable instruction(s) were found in block 1410 (block 1435), the example controller 505 associates the executable instructions (or a link to the same) with the media content (block 1445). For example, decoding (block 1415) and encoding (block 1420) may remove the executable instruction(s) (and/or the link to the same) or cause the executable instruction(s) (or the link/reference to the instructions) to be rendered unreadable. Therefore, the controller 505 reinserts the executable instruction(s) extracted in block 1410. Alternatively, if decoding (block 1415) and encoding (block 1420) does not affect the executable instruction(s), block 1435 and/or block 1440 may be skipped.

The example controller 505 of the example media device 105 then stores the re-encoded media content and/or uploads the media content to a content distributor (block 1445).

Figure 15A:
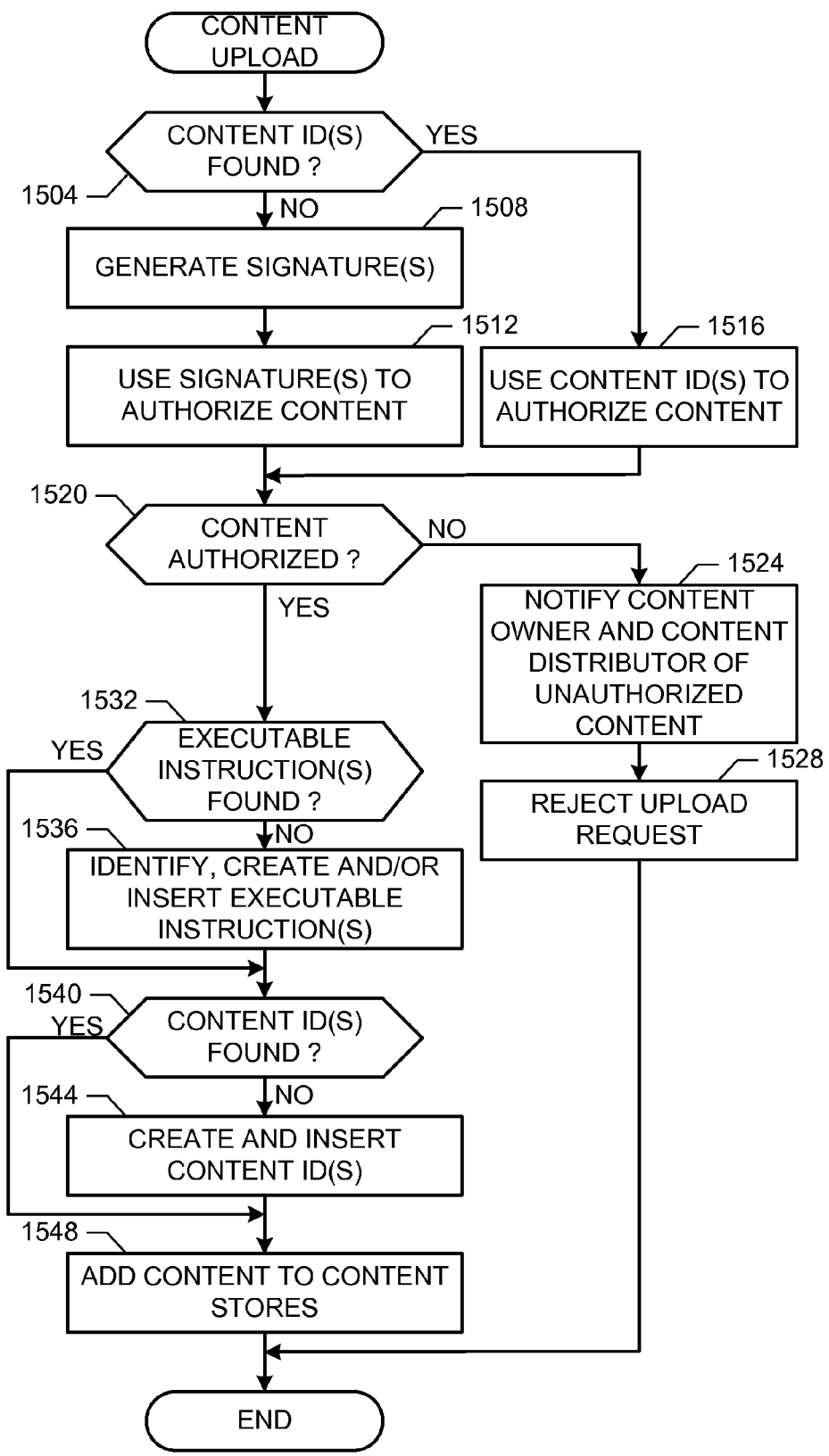
FIGS. 15A and 15B are flowcharts representative of example machine accessible instructions that may be executed to implement any or all of the example content distributors described herein.
Figure 15B:
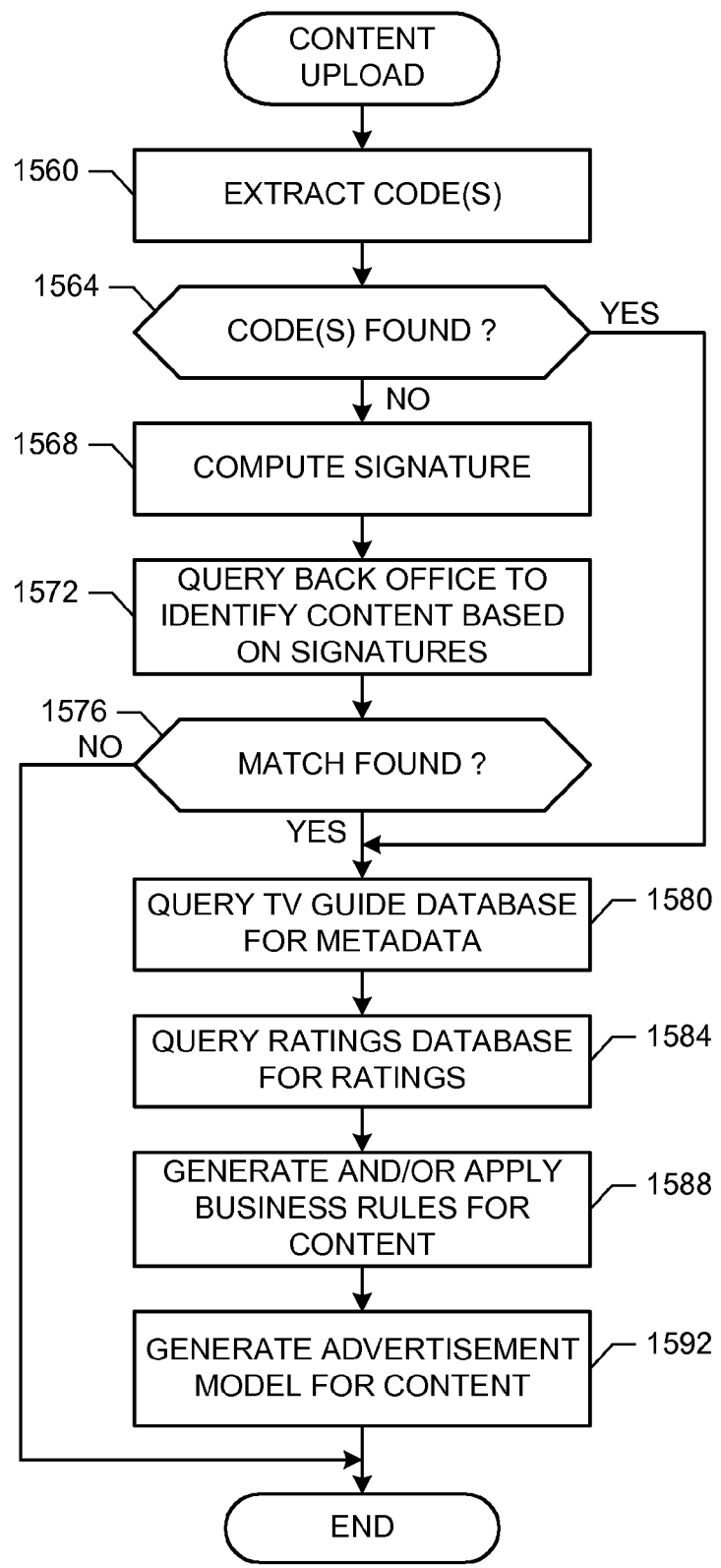

FIGS. 15A and 15B are flowcharts representative of example machine accessible instructions that may be carried out to implement any or all of the example content distributors 160 described herein. For example, the example machine accessible instructions may process media content that is uploaded to a content distributor 160 (e.g., a content distributor website).

The flowchart of FIG. 15A begins when the content authorizer 320 of the content distributor 160 in question determines if a media content at the example content distributor 160 includes or is associated with one or more content ID(s) (block 1504). If the content authorizer 320 determines that one or more content ID(s) were found (block 1504), the counter authorizer 320 uses the content ID(s) to authorize the content (block 1516). The content authorizer 320 may use any method for authorizing identified content such as, for example, reviewing authorization records for the content ID(s) available at the content distributor 160 (e.g., stored in the content stores 305), requesting authorization for the content associated with the content ID(s) from the DRMAM server 150, etc. In addition, the content authorizer 320 may verify the content ID(s) prior to authorizing the content. For example, the content authorizer 320 may verify a signature or metadata associated with the content containing the content ID(s) matches a signature or metadata associated with reference content associated with the content ID(s). Such a match limits or avoids the possibility of spoofing (e.g., associating false content ID(s) with unauthorized content to pass the content off as other content).

If the content authorizer 320 determines that one or more content ID(s) were not found (block 1504), the content authorizer 320 generates one or more signature(s) for the media content (block 1508). The content authorizer 320 then uses the signature(s) for authorizing the content (block 1512). The content authorizer 320 then determines if the content was authorized for upload/use (block 1520). If the content was not authorized for upload/use (block 1520), the content authorizer 320 notifies the content owner and/or content distributor of the unauthorized content (block 1524). The content authorizer 320 then rejects the upload request (block 1528). The machine readable instructions of FIG. 15A are then complete. The operations of blocks 1524 and 1528 may differ in alternative implementations. For example, notifications may be sent out but the content upload may be allowed or the content upload may be allowed while notifications are not sent. Alternatively, any other desired operation may be performed such as, for example, labeling the content, assigning the content to a category, marking the content for human review, requesting further information from the person uploading the content (e.g., requesting credentials that establish authorization for uploading the content), etc.

If the example content authorizer 320 determines that the content is authorized for upload/use (block 1520), the content authorizer 320 determines if the media content is associated with (e.g., includes or links to) machine executable instructions (block 1532). If it is determined that the media content is associated with executable instructions (block 1532), control proceeds to block 1540, which is described below. If it is determined that the uploaded media content does not include executable instructions (block 1532), the content authorizer 320 of the illustrated example identifies and/or creates executable instructions and associated executable instructions with the media content to be stored (block 1536). For example, the content authorizer 320 may extract and/or generate identifying information based on the media content and may request suitable machine executable instructions (e.g., for audience measurement and/or DRM purposes) from the DRMAM server 150.

The content authorizer 320 then determines if the uploaded media content includes one or more content ID(s) (block 1540). If the media content includes one or more content ID(s), control proceeds to block 1548, which is described below. If the media content does not include one or more content ID(s) (block 1540), the content authorizer 320 creates and associated one or more content ID(s) with the media content (block 1544). For example, the content authorizer 320 may use the next number in a list of consecutive content ID(s), may generate a content ID based on metadata associated with the media content, may retrieve a content ID from an external source (e.g., the DRMAM server 150), etc. The created content ID(s) are stored in association with the identity of the content and/or its DRM authorization rules for later use.

After adding any machine executable instructions, if necessary, (blocks 1532 and 1536) and/or adding any content ID(s), if necessary, (blocks 1540 and 1544), the content authorizer 320 stores the media content in the content stores 305. The machine readable instructions of FIG. 15A are then complete.

According to the illustrated example, the flowchart of FIG. 15B is performed after the flowchart of FIG. 15A has been performed. Alternatively, the flowchart of FIG. 15B may be performed at any other time with respect to the flowchart of FIG. 15A or may be performed exclusive of performance of FIG. 15A.

The flowchart of FIG. 15B begins when the code extractor 465 of FIG. 4B of the example content authorizer 320 of FIG. 3 attempts to extract one or more codes (e.g., codes) from media content stored at the content authorizer 320 (e.g., media content stored in the content stores 305) (block 1560). The code extractor 465 then determines if a code was found (block 1564). If a code was found (block 1564), control proceeds to block 1580, which is described below.

If a code is not found (block 1564), the example signature engine 475 computes, generates, and/or extracts a signature of the media content (block 1568). Then, the signature engine 475 uses the back office interface 450 to query a back office to identify the content in question based on the signature (block 1572). For example, the signature engine 475 may send a generated signature to the DRMAM server 150, an audience measurement back office, etc, and request identification of media content associated with that signature. The example signature engine 475 then determines if a match was found based on the signature (block 1576). For example, the signature engine 475 determines if an identification of the media content in question was received. If a match was not found (block 1576), the machine readable instructions of FIG. 15B terminate. For example, if a match is not received, it may be determined that the media content is unidentifiable or is not being tracked. In such a case, the content may be considered public domain and freely distributed. Other DRM rules may alternatively be applied.

If a match for the media content is found (block 1576), the television guide database interface 455 queries a television guide database for metadata associated with the identified media content (block 1580). The television guide database may be any type of database that stores information about media content such as, for example, a database providing program scheduling and description information for a television service provider, a database provided by an audience measurement services company, etc. The ratings database interface 460 then queries a ratings database to obtain ratings information, audience demographic information etc. associated with the identified media content or with second media content with which the first media content may be displayed (block 1584). Next, the business rules agent applies business rules for the content based on the television guide information and/or the ratings information (block 1588). For example, the business rules may specify that copyrighted media content is to be removed, a royalty is to be paid to the content owner, a license is to be negotiated with the content owner, the content is to be added to a content owner contract, etc. Rules based on ratings or demographics may also be applied. For example, distribution of the content may only be permitted to media devices associated with certain demographics and/or media content may only be distributed if it has a rating above or below a threshold and/or within a range of ratings. Next, the advertisement agent 485 generates an advertisement model for the media content (block 1592). For example, the advertisement agent 485 may generate an advertisement model, campaign, description, specification, proposal, etc. based on the television guide information and the ratings information. For example, a proposal for presenting an advertisement during a first show (e.g., the media content) with a high rating may include a higher cost than an advertisement proposal for presenting the advertisement during a second show (e.g., a second media content) with a lower rating. The machine readable instructions of FIG. 15B then terminate.

The example machine accessible instructions of FIGS. 14, 15A and 15B may also be carried out to implement the example operations described above in connection with FIGS. 8-13 to monitor and control access to media content. In particular, the machine accessible instructions may be carried out to monitor and/or authorize media content that is uploaded to a media distributor (e.g., YouTube, etc.), to search and/or crawl a network (e.g., the internet) for media content to monitor and/or authorized, etc.

Figure 16:
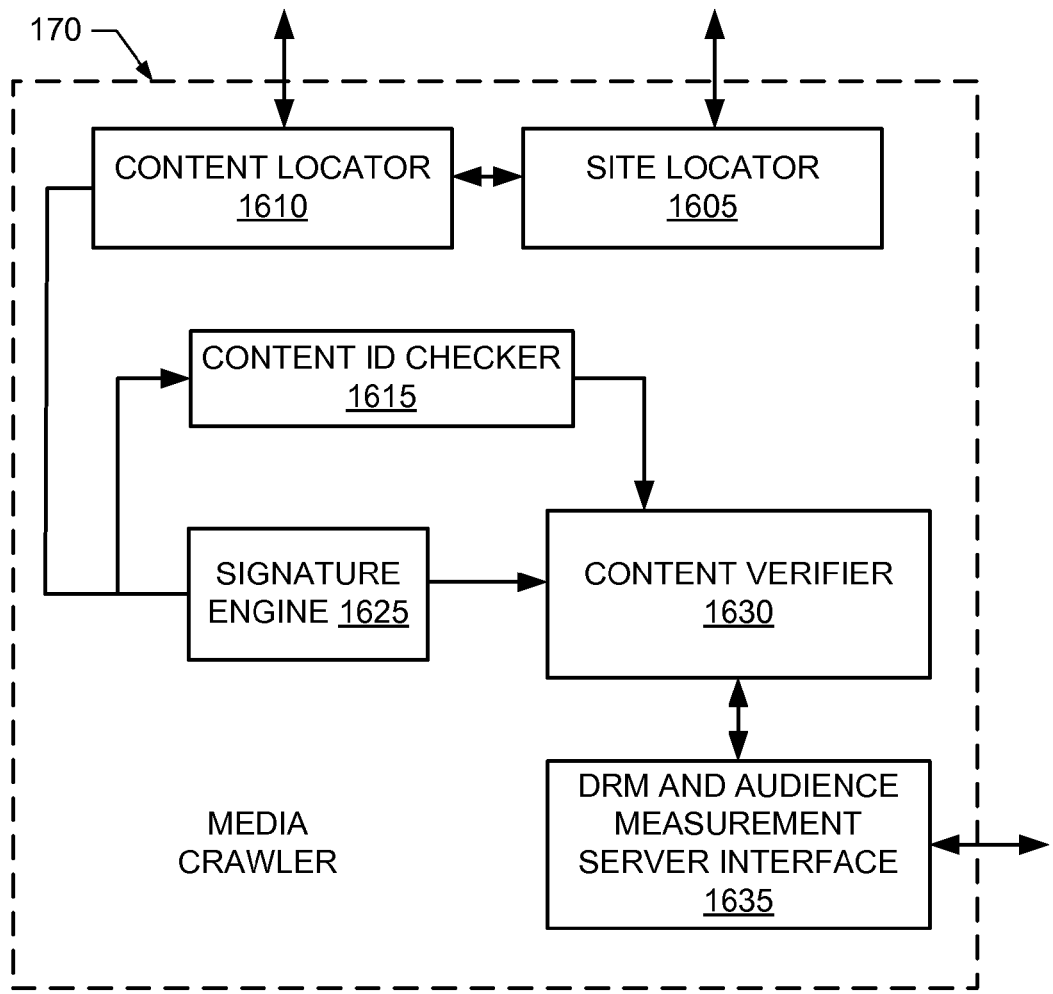
FIG. 16 illustrates an example manner of implementing the example media crawler of FIG. 1.

FIG. 16 illustrates an example manner of implementing the example media crawler 170 of FIG. 1. The media crawler 170 is designed to manually, automatically, and/or semi-automatically locate media content on a network and to monitor and/or authorize the media content. In the illustrated example, it is implemented by a server that locates servers and computers that are available on the internet and locates media content available at those servers and/or computers. To locate content distributors 160 (e.g., web sites from which media devices 105 may download content), the example media crawler 170 of FIG. 16 includes any number and/or types of site locators 1605. For example, the site locator 1605 may receive an identified starting web page and/or web server and may visit all web pages and/or web servers identified on the starting web page and/or web server. Alternatively, any other crawling technique may be used. To locate content available on located sites, the example media crawler 170 of FIG. 16 includes any number and/or types of content locators 1610. For example, the site locator 1605 and/or the content locator 1610 may implement a web spider and/or web robot that recursively and/or systematically identify content that is available to the media devices 105 on the Internet 120.

To extract, locate, and/or verify content identifiers present in, associated with, and/or contained in an identified piece of content, the example media crawler 170 of FIG. 16 includes a content identifier checker 1615. The example content identifier checker 1615 of FIG. 16 may attempt to obtain an audience measurement code and/or may extract other content identifier(s) (e.g., metadata, public identifiers, private identifiers, other content identifiers, etc.) from the content. The content identifiers may be any data associated with the content (e.g., within metadata and/or embedded within audio, image and/or video data). The media crawler 170 of the illustrated example includes a signature engine 1025 to generate, compute, and/or extract a signature or other identifying data (e.g., an identification unique to a particular media content) from the media content. In some examples, any or all of the content identifier checker 1615 and/or the signature engine 1625 (e.g., an audio signature engine) are not implemented by the media crawler 170. In such examples, the media crawler 170 collects copies of content and the extraction, determination and/or validation of content identifiers may be performed at the DRMAM server 150.

To verify whether a content provider 160 is authorized to distribute a located piece of content, the example media crawler 170 of FIG. 16 includes a content verifier 1630 and a DRMAM server interface 1635. The example content verifier 1630 sends the content or a sample thereof (e.g., in the case where code and/or signature extraction is performed at the DRMAM server 150) and/or sends the extracted and/or generated content identifier(s) (e.g., a code, signature and/or metadata) to the DRMAM server 150 via the DRMAM server interface 1635. The server 150 validates the information received from the media crawler 170. If the content is authorized, the DRMAM server 150 can catalog and/or record that the content is available at the particular content distributor 160 (e.g., website) from which the media crawler 170 retrieved the same. If the content is not authorized, the media crawler 170 and/or the DRMAM server 150 can notify the content distributor 160 (e.g., website operator) and/or the originating content provider 130 (e.g., television studio) that content is being illegally distributed at that content distributor 160. Thus, the DRMAM system can serve a copyright policing function.

Data collected by the example media crawler 170 of FIG. 16 may be stored, for example, on, by and/or within the example DRMAM server 150. Additionally or alternatively, the example media crawler 170 may generate one or more reports of located and/or identified content, and/or provide any portion of the collected data to one or more of the content providers 130 and/or the content distributors 160.

While an example manner of implementing the example media crawler 170 of FIG. 1 has been illustrated in FIG. 16, one or more of the data structures, elements, processes and/or devices illustrated in FIG. 16 may be combined, divided, re-arranged, omitted, eliminated and/or implemented in any of a variety of ways. Further, the example locators 1605 and 1610, the content identifier checker 1615, the signature engine 1625, the content verifier 1630 and/or the interface 1635 and/or, more generally, the example media crawler 170 may be implemented by hardware, software, firmware and/or any combination of hardware, software and/or firmware. Thus, for example, any of the example locators 1605 and 1610, the content identifier checker 1615, the signature engine 1625, the content verifier 1630 and/or the interface 1635 and/or, more generally, the example media crawler 170 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example locators 1605 and 1610, the content identifier checker 1615, the signature engine 1625, the content verifier 1630 and/or the interface 1635 and/or, more generally, the example media crawler 170 are hereby expressly defined to include a tangible medium such as a memory, DVD, CD, etc. Further still, the example media crawler 170 may include data structures, elements, processes and/or devices instead of, or in addition to, those illustrated in FIG. 16, and/or may include more than one of any or all of the illustrated data structures, elements, processes and/or devices.

Figure 17:
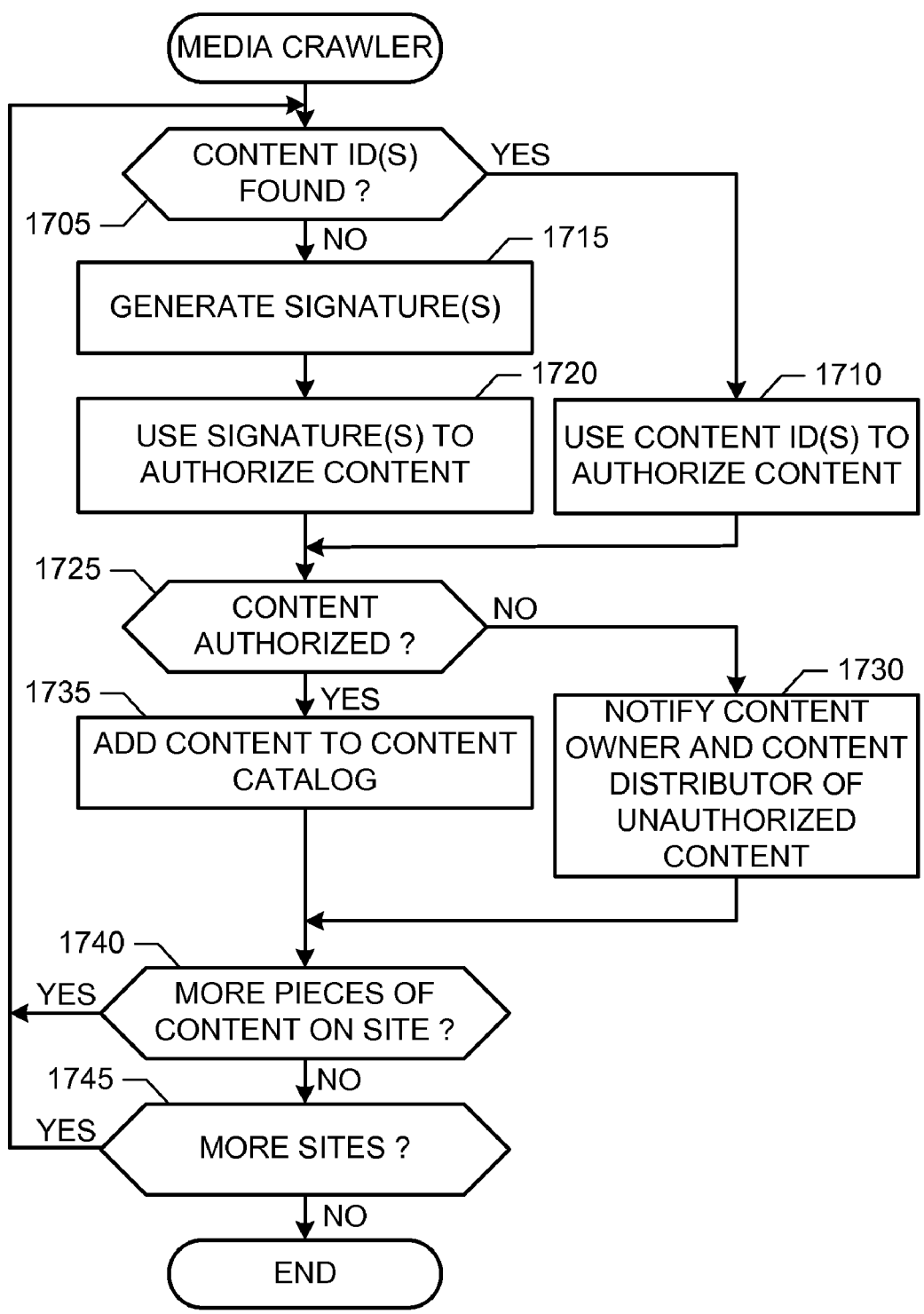
FIG. 17 is a flowchart representative of example machine accessible instructions that may be executed to implement any or all of the example media crawlers described herein.

FIG. 17 is a flowchart illustrating machine readable instructions that may be carried out to implement the example media crawler 170 of FIGS. 1 and 16. For example, the machine readable instructions may be carried out to process media content located by the media crawler 170.

The flowchart of FIG. 17 begins when the content ID checker 1615 of FIG. 16 of the media crawler 170 determines if media content at a site includes one or more content ID(s) (block 1705). For example, the site locator 1605 may locate a site that provides content and the content locator 1610 may locate first media content at that site. If the content ID checker 1615 determines that one or more content ID(s) were found (block 1705), the content verifier 1630 uses the content ID(s) to authorize the content (e.g., verify a license for distribution, request a license for distribution, etc.) via the DRMAM server interface 1635 (block 1710). The content verifier 1630 may additionally verify the content ID(s) prior to authorizing the content. For example, the content verifier 1630 may compare a signature or metadata associated with the content to a database to determine if it matches a signature or metadata associated with reference content associated with the content ID(s). If there is no match, the content ID(s) may be identified as a spoofing attempt.

If the content ID checker 1615 determines that one or more content ID(s) were not found (block 1705), the signature engine 1625 generates one or more signature(s) for the media content (block 1715). The content verifier 1630 then uses the signature(s) for authorizing the content (block 1720). The content verifier 1630 then determines if the content was authorized for upload/use (block 1725). If the content was not authorized for upload/use (block 1725), the content verifier 1630 notifies the content owner and/or content distributor of the unauthorized content (block 1730). Control then proceeds to block 1740, which is described below.

If the content verifier 1630 determines that the media content was authorized (block 1725), the content verifier 1630 sends the media content to the DRMAM server interface 1635 for addition to a content catalog (block 1735). For example, the media content may be sent to the DRMAM 150 for storage in a content catalog at the DRMAM 150, may be sent to a content catalog at one of the content distributors 160, or may be sent to any other content catalog.

After adding media content to the content catalog (block 1735) or notifying the content owner or content distributor (block 1730), the content locator 1610 determines if there is additional content at the site to be crawled (block 1740). If there is additional content available at the site (block 1740), control returns to block 1705 to crawl that content. If there is not additional content available at the site (block 1740), the site locator 1605 determines if there are further sites to crawl (block 1745). If there are further sites to crawl (block 1745), control returns to block 1705 to crawl the next site. If there are no further sites to crawl (block 1745), the machine readable instructions of FIG. 17 terminate.

The example machine accessible instructions of FIGS. 14, 15A, 15B and/or 17 may be carried out by a processor, a controller and/or any other suitable processing device. For example, the example machine accessible instructions of FIGS. 14, 15A, 15B and/or 17 may be embodied in coded instructions stored on a tangible medium such as a flash memory, a read-only memory (ROM) and/or random-access memory (RAM) associated with a processor (e.g., the example processor 2105 discussed below in connection with FIG. 21). Alternatively, some or all of the example machine accessible instructions of FIGS. 14, 15A, 15B and/or 17 may be implemented using any combination(s) of application specific integrated circuit(s) (ASIC(s)), programmable logic device(s) (PLD(s)), field programmable logic device(s) (FPLD(s)), discrete logic, hardware, firmware, etc. Thus, for example, any of the example content distributors 160 or the example media crawlers 170 (e.g., the site locator 1605, the content locator 1610, the content ID checker 1615, the signature engine 1625, the content verifier 1630, and/or the DRMAM server interface 1635) and/or, more generally, the example audience measurement system 100 could be implemented by one or more circuit(s), programmable processor (s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example content distributors 160 or the example media crawlers 170 (e.g., the site locator 1605, the content locator 1610, the content ID checker 1615, the signature engine 1625, the content verifier 1630, and/or the DRMAM server interface 1635) and/or, more generally, the example audience measurement system 100 are hereby expressly defined to include a tangible medium such as a memory, DVD, CD, etc. Also, some or all of the example machine accessible instructions of FIGS. 14, 15A, 15B and/or 17 may be implemented manually or as any combination of any of the foregoing techniques, for example, any combination of firmware, software, discrete logic and/or hardware. Further, although the example machine accessible instructions of FIGS. 14, 15A, 15B and 17 are described with reference to the flowcharts of FIGS. 14, 15A, 15B and 17, many other methods of implementing the machine accessible instructions of FIGS. 14, 15A, 15B and/or 17 may be employed. For example, the order of execution of the blocks may be changed, and/or one or more of the blocks described may be changed, eliminated, sub-divided, or combined. Additionally, any or all of the example machine accessible instructions of FIGS. 14, 15A, 15B and/or 17 may be carried out sequentially and/or carried out in parallel by, for example, separate processing threads, processors, devices, discrete logic, circuits, etc.

Figure 18:
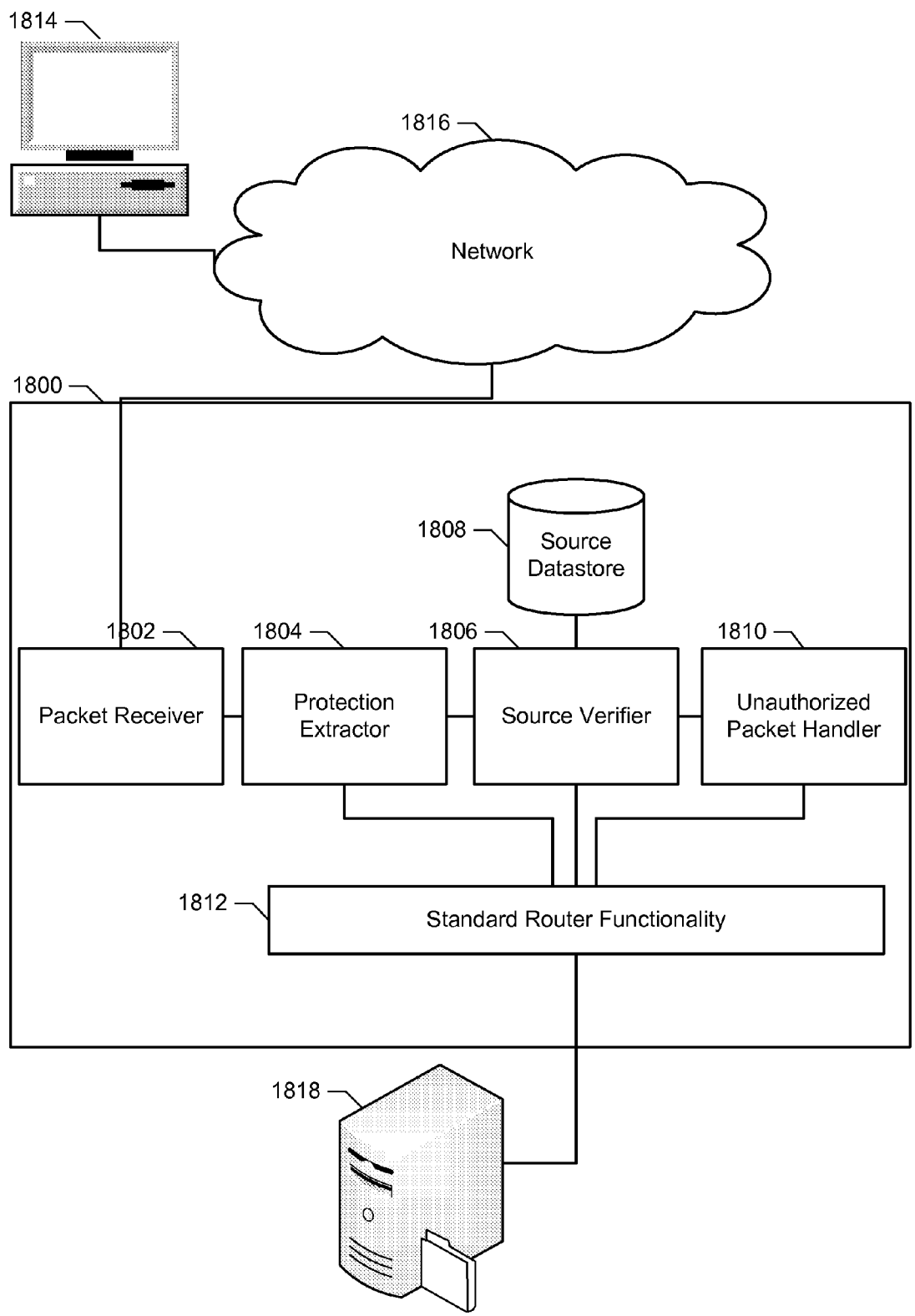
FIG. 18 is a block diagram of a router for controlling the transmission of media content.
Figure 19:
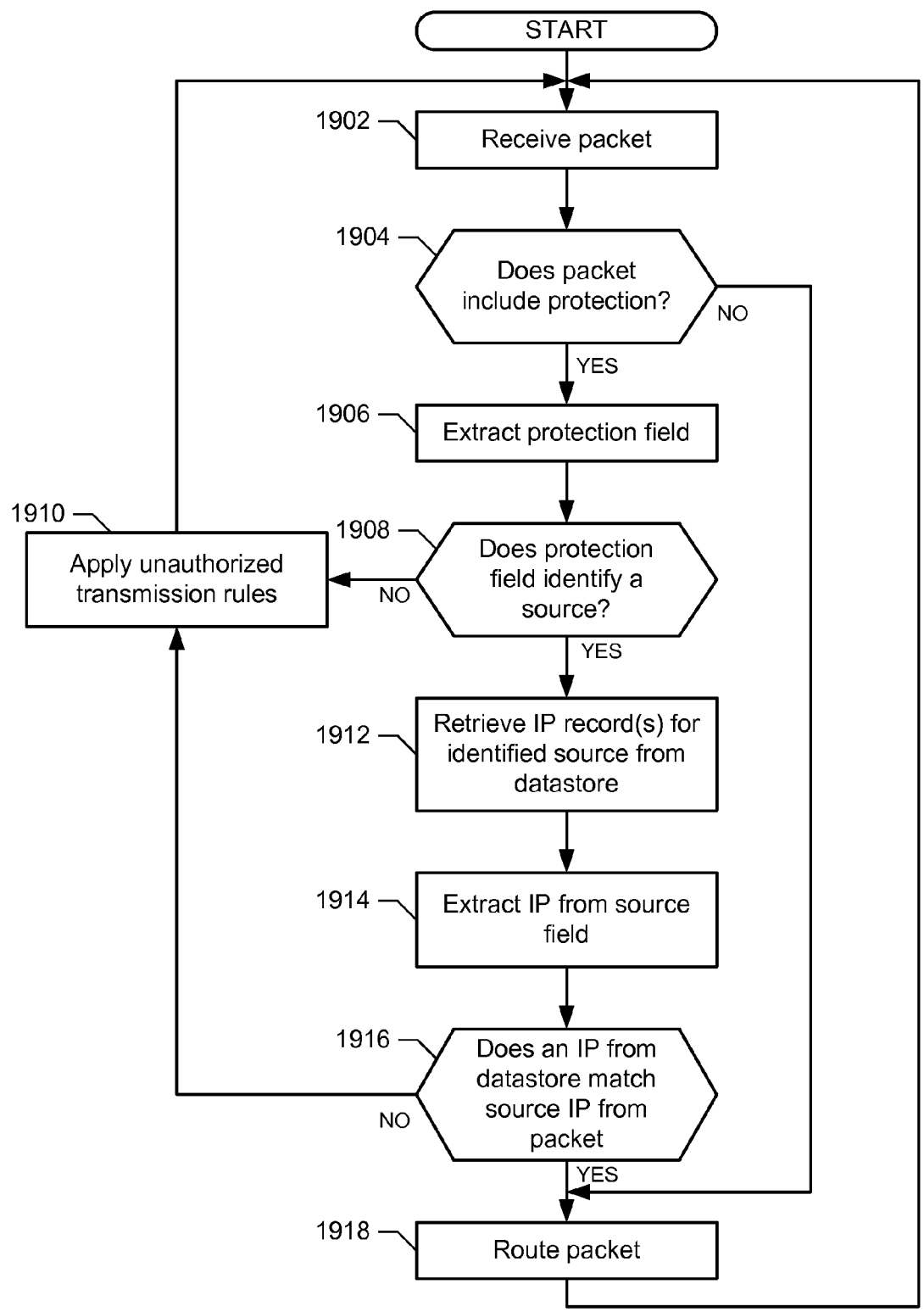
FIG. 19 is a flowchart of an example method for controlling the transmission of media content.

FIG. 18 is a block diagram of an example implementation of a router 1800 that is capable of controlling the transmission of media content. The example router 1800 may be used to route communications in the internet 120, the content provider(s) 130, and/or the content distributor(s) 160 of FIG. 1. For example, the router 1800 may process all media content that pass through the internet or a portion thereof (e.g., a part of the internet for an internet service provider, a backbone internet provider, etc.). FIG. 19 is a flowchart of an example method for implementing the router 1800 of FIG. 18.

The example router 1800 of FIG. 18 includes a packet receiver 1802 to receive communication packets from a packet sender 1814 (e.g., a user computer) via a network 1816. For example, if the router 1800 is installed at a user generated content website 160 (e.g., YouTube), the packet receiver 1802 receives communication packets from users (e.g., a user uploading a video file). If the packet receiver 1802 is installed in a service provider's network, the packet receiver 1802 receives content from users of the service provider network (e.g., a website transmitting packets to a subscriber of a service provider network or a subscriber transmitting packets to a website).

The protection extractor 1804 receives the received packet from the packet receiver 1802. The protection extractor 1804 determines if the received packet is identified as protected. To this end, the example protection extractor 1804 decodes the received packet to determine if a watermark (e.g., an identification code inserted in the content via the Nielsen Audio Encoding System (NAES) (see U.S. Pat. No. 6,968,564, which is hereby incorporated by reference in its entirety), any type of audio watermark code, any type of video watermark code, etc.) is present in the content included in the packet. The router 1800 may transmit the received packet to the standard router functionality 1812 in parallel with the decoding and analysis of the packet. In addition, the protection extractor 1804 may receive multiple packets (e.g., five time-consecutive packets) and decode and analyze the packets together to determine if a watermark is present. In addition to or as an alternative to determining if a watermark is present, the protection extractor 1804 may determine if the header of the packet includes a Protection field. In addition, the watermark and/or the packet header may indicate a source of the protected content. If the packet does not include a watermark and/or a Protection field, the packet is transmitted to standard router functionality 1812 for routing and distribution of the packet. In the illustrated example, the packet is routed to a server 1818. Additionally or alternatively, the protection extractor 1804 may add an identification to the packet header (e.g., add or update a Protection field) indicating that the content is authorized for transmission so that network elements later in the network distribution path will not need to decode the packet again. For example, the protector extractor 1804 may add a wrapper to each packet that has been verified, may add a field to the packet header, may modify a field in the packet header, etc. to indicate that the packet, stream, media content, etc. has already been verified. A router or other network or media device that receives the modified media content can analyze the packet header to prior to extracting or otherwise analyzing the packet for verification. Accordingly, a verification of the contents of media content can be performed once for a particular packet, stream, and/or media content and the packet header can be analyzed at a later time.

If the packet includes a watermark and/or Protection field, the protection extractor 1804 extracts the watermark and/or the contents of the Protection field and transmits the extracted watermark and/or contents to a source verifier 1806.

The source verifier 1806 receives the watermark and/or contents of the Protection field and determines if the received watermark and/or contents identifies a source. For example, the Protection field may include an identifier that indicates that the content should be blocked or should be allowed no matter who is sending the packet, or the Protection field may include one or more identifier(s) of a source that is allowed to transmit the content to the exclusion of other senders. For example, if an included watermark identifies iTunes™ Music Stores as the source, rules for the router 1800 may cause the packet to be allowed (e.g., transmitted to the standard router functionality 1812).

If the watermark and/or Protection field do not identify a source (e.g., the Protection field indicates that all transmissions should be blocked), the packet is transmitted to the unauthorized packet handler 1810. The unauthorized packet handler 1810 applies one or more rules for handling unauthorized packets. In the illustrated example, the unauthorized packet handler 1810 does not transmit the packet to the standard router functionality 1812 for routing. Alternatively, the unauthorized packet handler 1810 may mark the packet for low priority handling, delay transmission of the packet, etc. prior to transmitting the packet to the standard router functionality 1812 for routing. Additionally or alternatively, the unauthorized packet handler 1810 may cause subsequent packets associated with the same stream of media content to be treated as unauthorized packets (e.g., blocked, delayed, etc.). In other words, the unauthorized packet handler 1810 may process packets of a media content stream in parallel with the transmission of the packets through the network (e.g., via the router) and, once a packet of the stream has been determined to be unauthorized, may apply unauthorized transmission rules to all later packets (e.g., may block or delay all later packets) of the same or substantially the same stream. Additionally or alternatively, the unauthorized packet handler 1810 may add an identification to the packet header (e.g., add a Protection field if a Protection field is not present) that indicates that the media content is unauthorized media content so that network elements that received the packet later in the distribution path of the network can determine how to handle the media content without having to decode the packet.

If the watermark and/or Protection field identifies a source, the source verifier 1806 retrieves a record associated with the source from a source database 1808. The source database 1808 stores records associating one or more IP addresses with a watermark and/or a Protection field identifier (e.g., IP addresses that have been authorized for transmitting packets identified by the watermark and/or Protection field). For example, the source database 1808 may include a record for the iTunes Music Store that identifies all IP addresses that the iTunes Music Store might use to transmit music to customers. Alternatively, the watermark, Protection field, and/or other field of the packet may include an authorized IP address and, thus, extraction of the source IP address from the source database 1808 may not be performed.

The source verifier 1806 extracts a source IP address from the source field of the received packet (e.g., the actual IP address that sent the packet). The source verifier 1806 determines if the IP address from the source field of the received packet matches any of the IP addresses associated with the source identified in the watermark and/or Protection field (e.g., one or more IP addresses retrieved from the source database 1808 or included in the watermark or Protection field). If the IP address from the source field does not match any of the IP addresses associated with the source, the unauthorized packet handler 1810 applies one or more rules for handling unauthorized packets. In other words, if the packet is transmitted by a source that is not associated with the source identified in the watermark and/or Protection field (i.e., an unauthorized source), the packet is treated as an unauthorized packet. If the IP address from the source field matches one of the IP addresses associated with the source, the packet is transmitted to the standard router functionality 1812 for routing to its destination. As previously described, in the illustrated example, the packet is routed to the server 1818.

While the forgoing description references router 1800, the router 1800 may alternatively be implemented by any type of network element such as, for example, a server, a network switch, a firewall, a gateway, a bridge, etc.

While the forgoing description describes decoding packets to determine if a single watermark is present, media content may alternatively include multiple watermarks that may be verified. The router 1800 may include rules for handling multiple watermarks. Also, rules for handling conflicting watermarks and/or Protection field contents may be defined. For example, if a first watermark indicates that media content is protected, but a second watermark indicates that media content protection should be ignored, the content would be determined to be authorized for transmission. More generally, media content having a first protection indicating watermark and a second protection releasing watermark may be allowed to transmit, may be delayed in transmission (as opposed to content that includes no watermark that is not delayed), may be blocked, etc.

While the forgoing description indicates that each packet of media content is examined, packets passing through the router 1800 may be spot checked. In other words, the router 1800 may randomly check packets or may periodically check packets. Further, packets may be analyzed prior to being allowed to pass through the router or packets may be buffered and analyzed in parallel with transmission (or offline). If packets are analyzed in parallel or offline and an unauthorized packet is detected, all later packets associated with the unauthorized packet may be controlled (e.g., may be blocked, delayed, modified, etc.).

In an example operation, the example packet sender 1814 sends a stream of packets corresponding to media content to the server 1818 via the network 1816. The example router 1800 is interposed between the network 1816 and the server 1816 or is an intermediate in the network 1816 (e.g., packets transmitted from the packet sender 1814 enter the network 1816, pass through the router 1800 and any other network elements, and exit the network 1816 wherein they are transmitted to the server 1818). The router 1800 analyzes the packets as described in the forgoing and as described in conjunction with FIG. 19. If the router 1800 determines that the packets are associated with unauthorized media content, restricted media content, or any other specified type of media content, the router 1800 applies business rules (e.g., blocks the content, delays the progression of the media content, sends a notification to the server 1818, sends a notification to the packet sender 1814, marks the packet (e.g., inserts an identifier in a packet header), etc.). If the business rules allow and/or specify that the content is to be transmitted to the server 1818, the router routes the packets to the server 1818 (e.g., via one or more other network elements).

FIG. 19 is a flowchart illustrating example machine readable instructions that may be carried out to implement the example router 1800 of FIG. 18.

The example flowchart of FIG. 19 begins when the example packet receiver 1802 receives communication packets from the packet sender 1814 (e.g., a user computer) via the network 1816 (block 1902). Then, the protection extractor 1804 determines if the received packet is identified as protected (block 1904). If the packet does not include a watermark and/or a Protection field (block 1904), the packet is transmitted to the standard router functionality 1812 for routing and distribution of the packet (block 1918).

If the packet includes a watermark and/or Protection field (block 1904), the protection extractor 1804 extracts the watermark and/or the contents of the Protection field and transmits the extracted watermark and/or contents to a source verifier 1806 (block 1906). The source verifier 1806 then receives the watermark and/or contents of the Protection field and determines if the received watermark and/or contents identifies a source (block 1908). If the watermark and/or Protection field do not identify a source (e.g., the Protection field indicates that all transmissions should be blocked) (block 1908), the packet is transmitted to the unauthorized packet handler 1810, which applies one or more rules for handling unauthorized packets (block 1910). Control then proceeds to block 1902 to process the next packet.

If the watermark and/or Protection field identifies a source, the source verifier 1806 retrieves a record associated with the source from a source database 1808 (block 1912). The source verifier 1806 then extracts a source IP address from the source field of the received packet (i.e., the actual IP address that sent the packet) (block 1914). The example source verifier 1806 determines if the IP address from the source field of the received packet matches any of the IP addresses associated with the source identified in the watermark and/or Protection field (e.g., one or more IP addresses retrieved from the source database 1808 or included in the watermark or Protection field) (block 1916). If the IP address from the source field does not match any of the IP addresses associated with the source (block 1916), the unauthorized packet handler 1810 applies one or more rules for handling unauthorized packets (block 1910). In other words, if the packet is transmitted by a source that is not associated with the source identified in the watermark and/or Protection field (i.e., an unauthorized source), the packet is treated as an unauthorized packet. Control then returns to block 1902 to process the next packet.

If the IP address from the source field matches one of the IP addresses associated with the source (block 1916), the packet is transmitted to the standard router functionality 1812 for routing to its destination (block 1918). As previously described, in the illustrated example, the packet is routed to the server 1818. Control then returns to block 1902 to process the next packet.

The example machine accessible instructions of FIG. 19 may be carried out by a processor, a controller and/or any other suitable processing device. For example, the example machine accessible instructions of FIG. 19 may be embodied in coded instructions stored on a tangible medium such as a flash memory, a read-only memory (ROM) and/or random-access memory (RAM) associated with a processor (e.g., the example processor 2105 discussed below in connection with FIG. 21). Alternatively, some or all of the example machine accessible instructions of FIG. 19 may be implemented using any combination(s) of application specific integrated circuit(s) (ASIC(s)), programmable logic device(s) (PLD(s)), field programmable logic device(s) (FPLD(s)), discrete logic, hardware, firmware, etc. Thus, for example, the example router 1800 of FIG. 18 (e.g., any or all of the packet sender 1814, the packet receiver 1802, the protection extractor 1804, the source verifier 1806, the source database 1808, the unauthorized packet handler 1810, the standard router functionality 1812, and/or the server 1818) could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example router 1800, the packet sender 1814, the packet receiver 1802, the protection extractor 1804, the source verifier 1806, the source database 1808, the unauthorized packet handler 1810, the standard router functionality 1812, and/or the server 1818 are hereby expressly defined to include a tangible medium such as a memory, DVD, CD, etc. Also, some or all of the example machine accessible instructions of FIG. 19 may be implemented manually or as any combination of any of the foregoing techniques, for example, any combination of firmware, software, discrete logic and/or hardware. Further, although the example machine accessible instructions of FIG. 19 are described with reference to the flowcharts of FIG. 19, many other methods of implementing the machine accessible instructions of FIG. 19 may be employed. For example, the order of execution of the blocks may be changed, and/or one or more of the blocks described may be changed, eliminated, sub-divided, or combined. Additionally, any or all of the example machine accessible instructions of FIG. 19 may be carried out sequentially and/or carried out in parallel by, for example, separate processing threads, processors, devices, discrete logic, circuits, etc.

Figure 20:
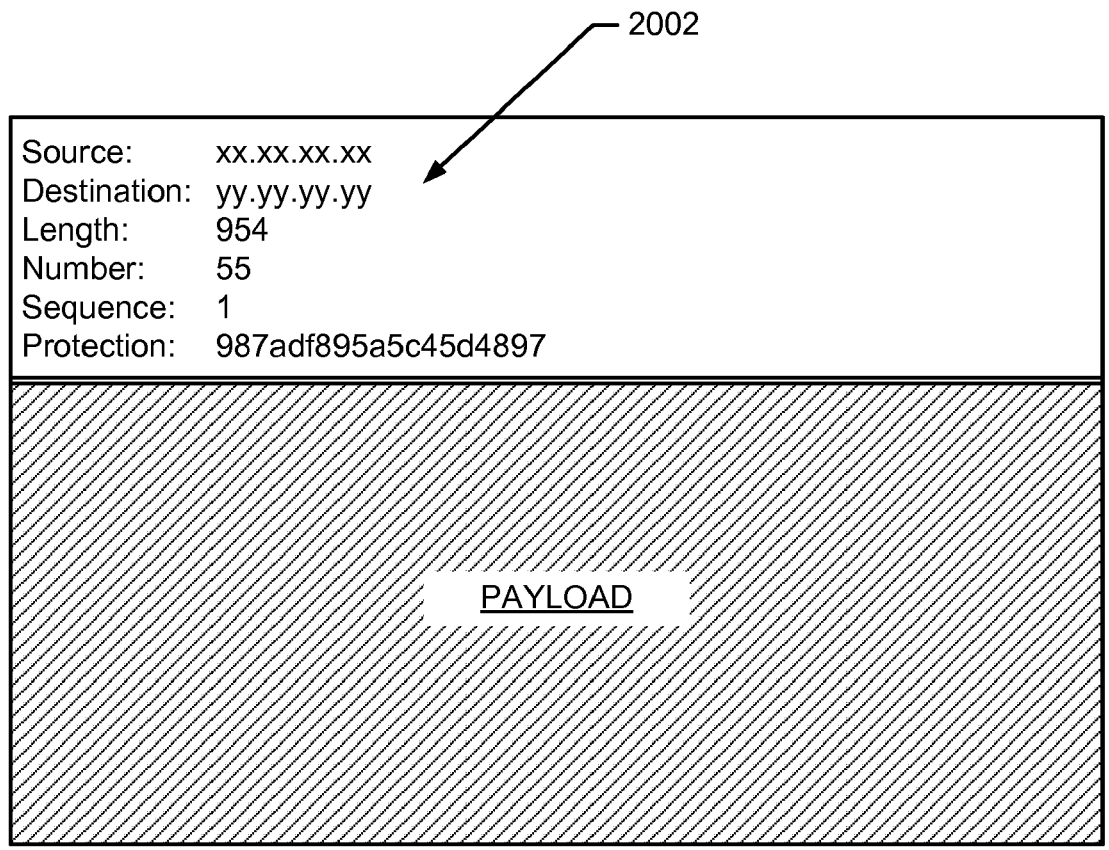
FIG. 20 is an illustration of an example packet that includes a Protection field.

FIG. 20 is an illustration of an example packet that includes a Protection field. A packet header 2002 includes a source field, a destination field, a packet length, a number of packets, a sequence number of the packet, and a Protection field. The example Protection field includes a hexadecimal protection flag. The contents of the Protection field could indicate that the packet should be unconditionally blocked from transmission. Additionally, the contents of the Protection field could identify a source that is authorized to transmit the packet.

Alternatively, the packet could include a second Protection Source field. The Protection Source field could be used to indicate a source authorized to transmit a packet. In such an implementation, the Protection field would only indicate whether or not the packet is subject to restriction. If the packet included an identifier in the Protection field but the Protection Source field was empty, the packet would be subject to unconditional blocking. If the packet includes an identifier in the Protection field and the Protection Source field, the source of the packet would be analyzed to ensure that the packet is being transmitted by an authorized source.

Figure 21:
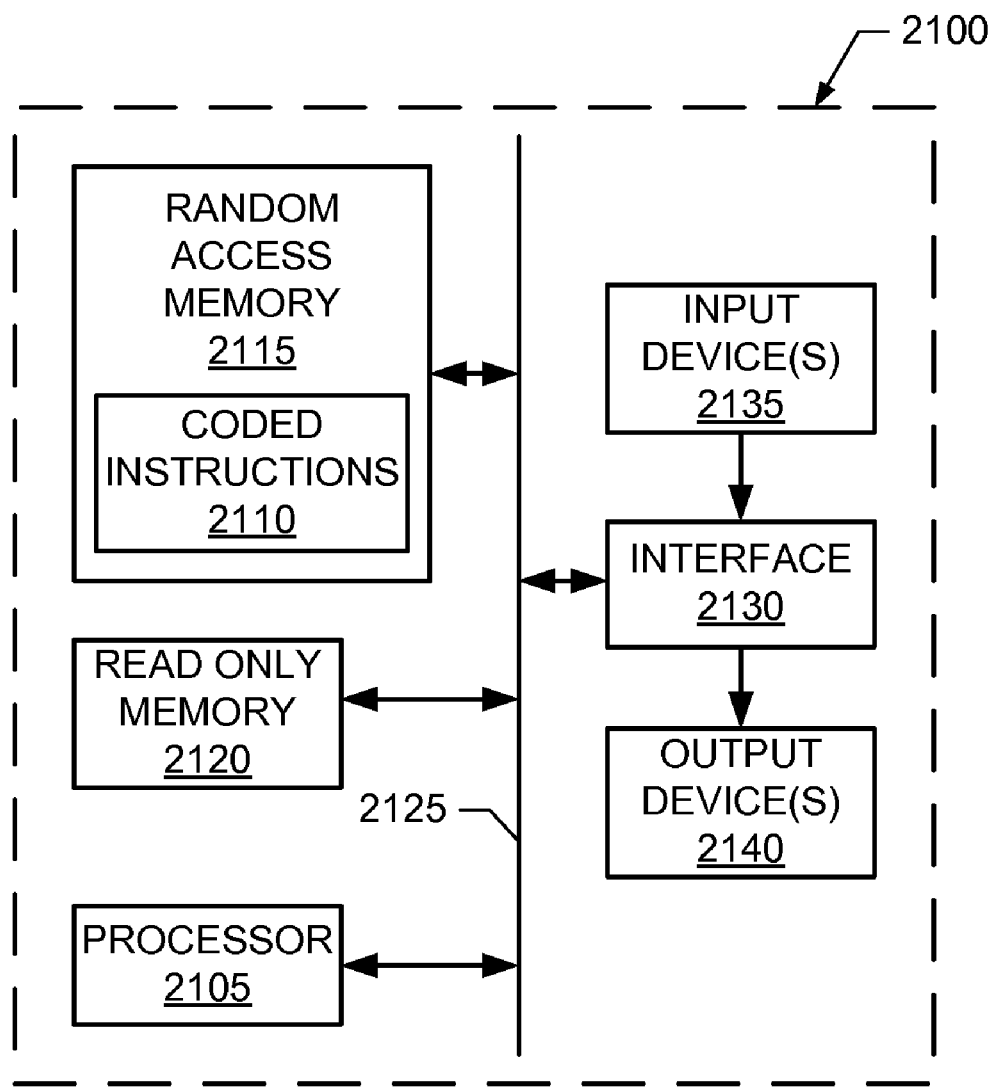
FIG. 21 is a schematic illustration of an example processor platform that may be used and/or programmed to perform any or all of the example machine accessible instructions of FIGS. 14, 15A, 15B, 17, and/or 19, and/or the example operations of FIGS. 8-13 to implement any or all of the example systems, example apparatus and/or example methods described herein.

FIG. 21 is a schematic diagram of an example processor platform 2100 that may be used and/or programmed to implement any or all of the example media devices 105, the example content providers 130, the example DRMAM server 150, the example content distributors 160, the example media crawlers 170 of FIG. 1, the example router 1800 of FIG. 18, and/or any other component described herein. For example, the processor platform 2100 can be implemented by one or more general purpose processors, processor cores, microcontrollers, etc.

The processor platform 2100 of the example of FIG. 21 includes at least one general purpose programmable processor 2105. The processor 2105 executes coded instructions 2110 and/or 2112 present in main memory of the processor 2105 (e.g., within a RAM 2115 and/or a ROM 2120). The processor 2105 may be any type of processing unit, such as a processor core, a processor and/or a microcontroller. The processor 2105 may execute, among other things, the example machine accessible instructions of FIGS. 14, 15A, 15B, 17, and/or 19, the example operations of FIGS. 8-13 and/or to implement any or all of the example DRMAM system 100 described herein. The processor 2105 is in communication with the main memory (including a ROM 2120 and/or the RAM 2115) via a bus 2125. The RAM 2115 may be implemented by DRAM, SDRAM, and/or any other type of RAM device, and ROM may be implemented by flash memory and/or any other desired type of memory device. Access to the memory 2115 and 2120 may be controlled by a memory controller (not shown). The RAM 2115 may be used to store and/or implement, for example, any or all of the example content database 205, the example consumption database 235 and/or the example content stores 305 of FIGS. 2 and 3.

The processor platform 2100 also includes an interface circuit 2130. The interface circuit 2130 may be implemented by any type of interface standard, such as a USB interface, a Bluetooth interface, an external memory interface, serial port, general purpose input/output, etc. One or more input devices 2135 and one or more output devices 2140 are connected to the interface circuit 2130. The input devices 2135 and/or output devices 2140 may be used to implement any or all of the example interfaces of FIGS. 2, 3, 4A, 4B, 5 and 16.

The example system 100 of FIG. 1 implements a media content authorization system that allows content distributors (e.g., YouTube, Break.com, etc.), content providers, P2P distribution systems (e.g., P2P servers, P2P software, P2P network elements. etc.), and/or any other systems that handle media content to verify that media content is authorized for distribution before accepting media content and distributing the media content. The example system 100 utilizes various data sources (e.g., a audience ratings data source, a program information data source, etc.) to determine how media content should be handled. Accordingly, the example system 100 can make a better determination about whether media content should be distributed. In addition, the example system 100 is capable of using the same or different data stores for determining how to display media content. In particular, the example system 100 is capable of determining what type of commercials should be displayed in conjunction with media content and determining an amount that should be charged to an advertiser for displaying an advertisement with the media content. Accordingly, the example system 100 of FIG. 1 provides a more complete solution for handling media content in a network such as at a content distributor or at a media content provider.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for receiving media content at a content distribution site, the method comprising:
    attempting to extract a code associated with the media content from at least one of audio or video of the media content, wherein the media content is to be uploaded to a content distributor;
    when the code is obtained, querying a program information database for program information associated with the media content using the code;
    querying a ratings database for ratings information associated with the media content using the code; and
    processing the media content based on the program information and the rating information, wherein processing the media content comprises:
        determining if the media content should be stored at the content distribution site based on the program information and the ratings information; and
        storing the media content at the content distribution site based on the determination.

2. A method as defined in claim 1, wherein processing the media content comprises:
    determining an owner of the media content based on at least one of the program information and the ratings information; and
    sending a request for a license to the content owner.

3. A method as defined in claim 2, wherein sending the request comprises:
    determining a royalty based on the ratings information; and
    identifying the royalty in the request for the license.

4. A method as defined in claim 1, wherein the program information includes an indication of a distribution license for the media content.

5. A method as defined in claim 1, further comprising:
    determining if the code was obtained from the media content;
    when the code was not obtained from the media content:
        computing a signature for the media content;
        sending a query to a database to identify the media content based on the signature;
        receiving a response from the database including an identification of the media content;
        querying the program information database for the program information associated with the media content using the identification of the media content; and querying the ratings database for the ratings information associated with the media content using the identification of the media content.

6. A method as defined in claim 1, further comprising generating an advertisement proposal for the media content based on the program information and the ratings information.

7. A method as defined in claim 6, wherein generating the advertisement proposal includes:
    determining a fee for distributing an advertisement with the media content; and
    sending the advertisement proposal including the fee to an advertiser.

8. A method as defined in claim 1, further comprising determining if the media content is authorized for distribution based on the code.

9. A method as defined in claim 1, further comprising crawling a storage medium available to a media device to locate the media content.

10. An apparatus comprising:
    a content upload interface to receive a request to upload media content to a content distributor;
    a code extractor to attempt to obtain a code associated with the media content by extracting an identifier value from at least one of audio or video of the media content;
    a television guide database interface to, when the code is obtained, query a program information database for program information associated with the media content using the code;
    a ratings database interface to query a ratings database for ratings information associated with the media content using the code; and
    a processor to, when the code is obtained, process the media content based on the program information and the ratings information, wherein processing the media content comprises:
        determining if the media content should be stored at the content distribution site based on the program information and the ratings information; and
        storing the media content in a content store at the content distribution site based on the determination.

11. An apparatus as defined in claim 10, further comprising:
    a content owner identifier to determine an owner of the media content based on the program information, wherein the processor is further to send a request for a license to the content owner.

12. An apparatus as defined in claim 11, wherein sending the request comprises:
    determining a royalty based on the ratings information; and
    identifying the royalty in the request for the license.

13. An apparatus as defined in claim 10, further comprising:
    an office interface; and
    a signature engine to determine if the code was obtained from the media content, wherein when the code was not obtained from the media content:
        the signature engine is further to compute a signature for the media content;
        the office interface is to send a query to a database to identify the media content based on the signature and to receive a response from the database including an identification of the media content;
        the television guide database interface is further to query the program information database for the program information associated with the media content using the identification of the media content; and
        the ratings database interface is further to query the ratings database for the ratings information associated with the media content using the identification of the media content.

14. An apparatus as defined in claim 10, further comprising an advertisement agent to generate an advertisement proposal for the media content based on the program information and the ratings information.

15. An apparatus as defined in claim 14, wherein the advertisement agent is further to:
    determine a fee for distributing an advertisement with the media content; and
    send the advertisement proposal including the fee to an advertiser.

16. An apparatus as defined in claim 10, further comprising a digital rights management and audience measurement server interface to determine if the media content is authorized for distribution based on the code.

17. An apparatus as defined in claim 10, further comprising a crawler to crawl a storage medium available to a media device to locate the media content.

18. An apparatus as defined in claim 10, wherein the code is the identifier value.

19. An apparatus as defined in claim 10, wherein the identifier value is a watermark.

20. A tangible machine readable medium storing instructions that, when executed, cause the machine to at least:
    attempt to obtain a code associated with media content by extracting an identifier value from at least one of audio or video of the media content, wherein the media content is to be uploaded to a content distributor site;
    when the code is obtained, query a program information database for program information associated with the media content using the code;
    query a ratings database for ratings information associated with the media content using the code; and
    process the media content based on the program information and the ratings information, wherein the instructions cause the machine to process the media content by:
        determining if the media content should be stored at the content distribution site based on the program information and the ratings information; and
        storing the media content at the content distribution site based on the determination.

21. A machine readable medium as defined in claim 20, wherein the instructions, when executed, further cause the machine to:
    determine if the code was obtained from the media content;
    when the code was not obtained from the media content:
        compute a signature for the media content;
        send a query to a back office to identify the media content based on the signature;
        receive a response from the back office including an identification of the media content;
        query the program information database for the program information associated with the media content using the identification of the media content; and
        query the ratings database for the ratings information associated with the media content using the identification of the media content.

22. A machine readable medium as defined in claim 20, wherein the instructions, when executed, further cause the machine to generate an advertisement proposal for the media content based on the program information and the ratings information.

* * * * *